US006727200B2

(12) United States Patent
Maher et al.

(10) Patent No.: US 6,727,200 B2
(45) Date of Patent: Apr. 27, 2004

(54) HIGH DIELECTRIC CONSTANT VERY LOW FIRED X7R CERAMIC CAPACITOR, AND POWDER FOR MAKING

(75) Inventors: Galeb H. Maher, Williamstown, MA (US); Samir Maher, Williamstown, MA (US)

(73) Assignee: MRA Laboratories, Inc., Adams, MA (US)

( * ) Notice: Subject to any disclaimer, the term of this patent is extended or adjusted under 35 U.S.C. 154(b) by 351 days.

(21) Appl. No.: 10/036,205

(22) Filed: Oct. 29, 2001

(65) Prior Publication Data

US 2002/0058580 A1 May 16, 2002

Related U.S. Application Data

(63) Continuation-in-part of application No. 09/652,562, filed on Aug. 31, 2000, now Pat. No. 6,309,995.

(51) Int. Cl.[7] ........................ C04B 35/468; H01G 4/10; H01G 4/30

(52) U.S. Cl. ........................ 501/139; 264/605; 264/615; 361/301.4; 361/321.3; 361/321.4; 361/321.5; 501/138

(58) Field of Search ................................ 501/139, 138; 264/605, 615; 361/301.4, 321.3, 321.4, 321.5

(56) References Cited

U.S. PATENT DOCUMENTS 4,266,265 A 5/1981 Maher
4,525,767 A * 6/1985 Alexander ............... 361/321.5
5,010,443 A 4/1991 Maher
5,219,812 A * 6/1993 Doi et al. .................... 501/138
5,258,338 A 11/1993 Maher
5,319,517 A * 6/1994 Nomura et al. .......... 361/321.4
5,453,409 A * 9/1995 Kishi et al. ................. 501/139
5,650,367 A * 7/1997 Fujikawa et al. ........... 501/139
6,043,174 A 3/2000 Maher et al.
6,251,816 B1 6/2001 Maher et al.
6,309,995 B1 10/2001 Maher et al.
6,544,916 B1 * 4/2003 Sato et al. .................. 501/137

OTHER PUBLICATIONS

Foster and Symes, "Development of Ultra–Low Fire COG and X7R Dielectric Compositions for Multilayer Ceramic Chip Capacitor and Integrated Passive Component Applications", published in "The International Journal of Microcircuits and Electronic Packaging", vol. 22, No. 1, First Quarter, (1999), no month provided.

* cited by examiner

*Primary Examiner*—David Brunsman
(74) *Attorney, Agent, or Firm*—Malcolm J. Chisholm, Jr.

(57) ABSTRACT

A dielectric ceramic powder and multilayer ceramic capacitors made from the powders are disclosed. A dielectric start powder mixture includes at least ninety weight percent essentially pure barium titanate powder having an average particle size of from 0.2 to 1.2 microns; from 0.2 to 2.5 weight percent of barium lithium borosilicate; from 0.1 to 0.3 weight percent of $MnCO_3$; 0.4 to 1.50 weight percent $Nb_20_5$ or a niobate compound, or a molar equivalent of $Ta_20_5$ or a tantalum compound as a grain growth inhibitor; and, 0.4 to 1.2 weight percent of gadolinium oxide ($Gd_2O_3$). The start powder mixture is calcined and then sintered in an open zirconia setter at from 950° C. to 1,025° C. to produce a dielectric ceramic body that satisfies X7R capacitor performance characteristics; that includes no hazardous heavy metal oxides; and, that may include silver-palladium electrodes having 85 weight percent or more of silver.

19 Claims, 46 Drawing Sheets

FIG.3-1

TABLE 1

Effect of (BLBS Flux) Addition

Base Composition w%: ($BaTiO_3$+ 0.1$MnCO_3$+ BLBS Flux)

Fired at: 950°C/3 Hrs.

| Example | Experiment | $BaTiO_3$ wt.% | BLBS wt.% | Density $g/cm^3$ | Grain Size um | K | % D.F. |
|---|---|---|---|---|---|---|---|
| | | | | | | | |
| 1 | 99-147A | 98.9 | 1.0 | 5.8 | <1.0 | 3200 | 0.62 |
| 2 | 99-147B | 98.4 | 1.5 | 5.87 | <1.0 | 3125 | 0.70 |
| 3 | 99-142A | 97.9 | 2.0 | 5.84 | <1.0 | 2820 | 0.53 |
| 4 | 99-142B | 96.9 | 3.0 | 5.85 | <1.0 | 2550 | 0.60 |
| 5 | 99-142C | 95.9 | 4.0 | 5.82 | <1.0 | 2420 | 0.61 |
| 6 | 99-137A | 93.9 | 6.0 | 5.76 | <1.0 | 2125 | 0.52 |
| 7 | 99-137B | 88.9 | 10.0 | 5.53 | <1.0 | 1650 | 0.53 |

| | TCC% @ | | | | Comments |
|---|---|---|---|---|---|
| -55C | -15C | 85C | 105C | 125C | |
| -23 | -19 | -3 | 4 | 56 | |
| -23 | -18 | -5 | 1 | 47 | |
| -18 | -18 | -3 | 4 | 47 | Liquid Phase Formation |
| -17 | -14 | -4 | 2 | 32 | Liquid Phase Formation |
| -17 | -15 | -6 | -1 | 30 | Liquid Phase Formation |
| -18 | -15 | -3 | -3 | 30 | Liquid Phase Formation |
| -18 | -14 | -1 | -1 | 24 | Slight Porosity |

FROM FIG. 3-1

FIG. 4-1

TABLE 2

Effect of $(Nd_2O_3)$ Addition

Base Composition w%: $(BaTiO_3 + 2$ BLBS FLUX $+ 0.1\ MnCO_3)$

Fired at: 950°C/3 Hrs.

| Example | Experiment | $BaTiO_3$ wt.% | $Nd_2O_3$ wt.% | Density $g/cm^3$ | Grain Size um | K | % D.F. |
|---|---|---|---|---|---|---|---|
| 8 | 99-158A | 97.4 | 0.5 | 5.94 | 1-5 | 2400 | 0.7 |
| 9 | 99-158B | 96.9 | 1.0 | 5.97 | 1-5 | 2100 | 0.7 |
| 10 | 99-158C | 96.4 | 1.5 | 5.97 | 1-3 | 2260 | 0.89 |
| 11 | 01-237A | 95.9 | 2.0 | 5.95 | 1-2 | 3060 | 1.35 |
| 12 | 01-237B | 95.4 | 2.5 | 5.97 | 1-2 | 3140 | 0.90 |
| 13 | 01-237C | 94.9 | 3.0 | Porous | - | - | - |
| 14 | 01-237D | 94.4 | 3.5 | Porous | - | - | - |

| -55C | -15C | TCC% @ 85C | 105C | 125C | Comments |
|---|---|---|---|---|---|
| -33 | -24 | 15 | 80 | 64 | Solid Solution |
| -39 | -24 | 70 | 152 | 46 | Solid Solution |
| -39 | -6 | 206 | 54 | 2 | Solid Solution |
| -33 | -13 | 7 | -25 | -41 | Solid Solution |
| -22 | -13 | -31 | -42 | -48 | Solid Solution |
| — | — | — | — | — | Very Porous |
| — | — | — | — | — | Very Porous |

FROM FIG. 4-1

FIG.5-1

TABLE 3

Effect of ($Gd_3O_3$) Addition

Base Composition w%: ($BaTiO_3$ + 2 w% BLBS FLUX + 0.1 $MnCO_3$)

Fired at: 950°C/3 Hrs.

| Example | Experiment | $BaTiO_3$ wt.% | $Gd_2O_3$ wt.% | Density $g/cm^3$ | Grain Size um | K | % D.F. |
|---|---|---|---|---|---|---|---|
| | | | | | | | |
| 15 | 99-142A | 97.9 | 0 | 5.84 | <1.0 | 2820 | 0.53 |
| 16 | 99-153A | 97.5 | 0.4 | 5.87 | <1.0 | 2470 | 0.73 |
| 17 | 99-157A | 97.3 | 0.5 | 5.88 | <1.0 | 2400 | 0.58 |
| 18 | 99-157B | 97.1 | 0.8 | 5.85 | <1.0 | 2390 | 0.55 |
| 19 | 99-157C | 96.9 | 1.0 | 5.78 | <1.0 | 2420 | 0.63 |

| | | TCC% @ | | | | Comments |
|---|---|---|---|---|---|---|
| -55C | -15C | 85C | 105C | 125C | | |
| -18 | -18 | -3 | 4 | 47 | | Some Liquifd Phase |
| -23 | -16 | 8 | 36 | 55 | | Fine Grains |
| -21 | -13 | 12 | 41 | 47 | | Fine Grains |
| -19 | -12 | 15 | 38 | 41 | | Fine Grains |
| -18 | -12 | 16 | 30 | 33 | | Fine Grains |

FROM FIG. 5-1

FIG. 6-1

TABLE 4

Effect of ($Nb_2O_3$) Addition

Base Composition w%: ($BaTiO_3$ + 2 BLBS FLUX + 0.8 $Gd_2O_3$ + 0.1 $MnCO_3$)

Fired at: 950°C/3 Hrs.

| Example | Experiment | $BaTiO_3$ wt.% | $Nb_2O_3$ wt.% | Density $g/cm^3$ | Grain Size um | K | % D.F. |
|---|---|---|---|---|---|---|---|
| | | | | | | | |
| 20 | 01-167A | 97.1 | 0.0 | 5.92 | <1.0 | 2400 | 0.55 |
| 21 | 01-167B | 96.7 | 0.4 | <5.5 | >10 | - | - |
| 22 | 01-167C | 96.3 | 0.6 | <5.5 | >10 | - | - |
| 23 | 01-167D | 95.1 | 0.8 | 5.9 | 1-2 | 4370 | 7.0 |
| 24 | 01-168E | 95.9 | 1.0 | 5.89 | <1.0 | 3270 | 07 |

FROM FIG. 6–1

| TCC% @ | | | | | Comments |
|---|---|---|---|---|---|
| −55C | −15C | 85C | 105C | 125C | |
| | | | | | |
| −19 | −12 | 15 | 45 | 47 | |
| – | – | – | – | – | Porous, Large Grains |
| – | – | – | – | – | Porous, Large Grains |
| −28 | −12 | 2 | −4 | −16 | Start of Core–Shell |
| −7 | −3 | −13 | −10 | 3 | Core–Shell |

FIG. 7-1

TABLE 5

Effect of (R.E.O.) Addition

Base Composition w%: ($BaTiO_3$ + 2 BLBS FLUX + 0.2 $BaO.B_2O_3$ + 1 $Nb_2O_3$ + 0.1 $MnCO_3$)

Fired at: 975°C/3 Hrs.

| Example | Experiment | $BaTiO_3$ wt.% | R.E.O. wt.% | Density g/cm$^3$ | Grain Size um | K | % D.F. |
|---|---|---|---|---|---|---|---|
| | | | | | | | |
| | | | $Gd_2O_3$ | | | | |
| 25 | 20-54A | 96.32 | 0.4 | 5.78 | <1.0 | 2345 | .84 |
| 26 | 20-54B | 96.12 | 0.6 | 5.78 | <1.0 | 2450 | .91 |
| 27 | 20-41B | 95.92 | 0.8 | 5.92 | <1.0 | 2700 | .94 |
| 28 | 20-54C | 95.72 | 1.0 | 5.92 | <1.0 | 2640 | 0.91 |
| 29 | 20-54D | 95.52 | 1.2 | 5.92 | <1.0 | 2850 | 0.96 |
| 30 | 20-95A | 95.3 | 1.6 | 5.76 | 1-2 | 3460 | 1.73 |

FROM FIG. 7-1

| TCC% @ | | | | | Comments |
|---|---|---|---|---|---|
| -55C | -15C | 85C | 105C | 125C | |
| | | | | | |
| | | | | | |
| -6 | -4 | -1.0 | 2.3 | 16 | Core-Shell |
| -7 | -4 | -0.7 | 3 | 18 | Core-Shell |
| -7 | -3 | -4 | -2 | 9 | Core-Shell |
| -6 | -5 | -8 | -7 | 12 | Core-Shell |
| -11 | -3 | -5 | 3 | 2 | Core-Shell |
| -31 | -22 | -10 | -26 | -33 | Solid Solution |

TO FIG. 7-4

FROM FIG.7-1

FIG.7-3

| | | | | | | | |
|---|---|---|---|---|---|---|---|
| 31 | 20-95B | 95.1 | 1.8 | 5.66 | 1-2 | 3290 | 2.0 |
| 32 | 20-95C | 94.9 | 2.0 | 5.63 | 1-2 | 3190 | 2.0 |
| | | | | | | | |
| | | | $CeO_2$ | | | | |
| 33 | 20-55A | 96.32 | 0.4 | <5.5 | <1.0 | – | – |
| 34 | 20-55B | 96.12 | 0.6 | <5.5 | <1.0 | – | – |
| 35 | 20-55C | 95.92 | 0.8 | <5.5 | <1.0 | – | – |
| 36 | 20-55D | 95.72 | 1.0 | <5.5 | <1.0 | – | – |
| 37 | 20-55E | 95.52 | 1.2 | <5.5 | <1.0 | – | – |
| | | | | | | | |
| | | | $Y_2O_3$ | | | | |
| 38 | 20-56A | 96.32 | 0.4 | <5.5 | <1.0 | – | – |
| 39 | 20-56B | 96.12 | .6 | <5.5 | <1.0 | – | – |

TO FIG. 7-4

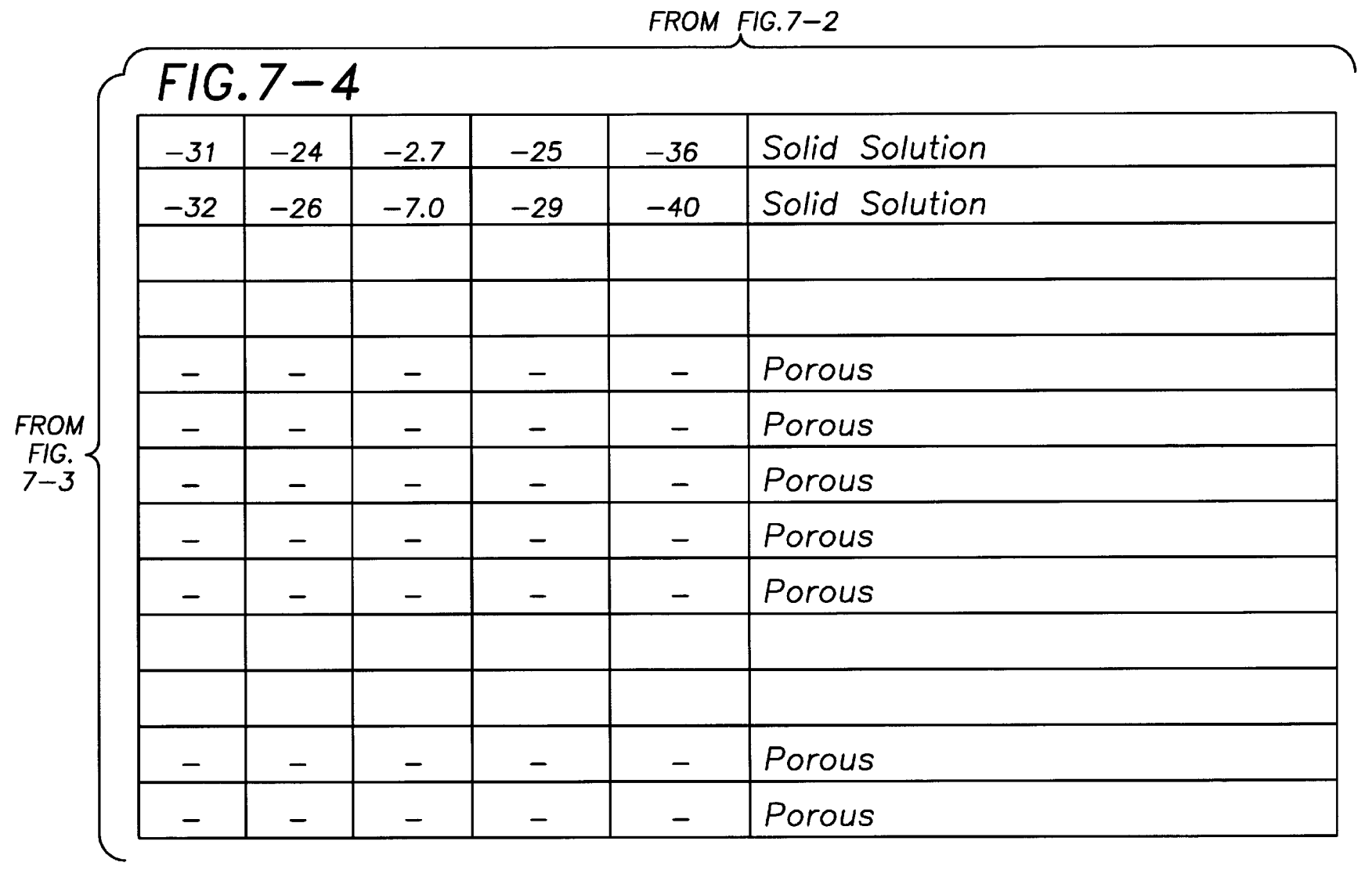

FROM FIG.7–2

FIG.7–4

FROM FIG. 7–3

| | | | | | |
|---|---|---|---|---|---|
| –31 | –24 | –2.7 | –25 | –36 | Solid Solution |
| –32 | –26 | –7.0 | –29 | –40 | Solid Solution |
| | | | | | |
| | | | | | |
| – | – | – | – | – | Porous |
| – | – | – | – | – | Porous |
| – | – | – | – | – | Porous |
| – | – | – | – | – | Porous |
| – | – | – | – | – | Porous |
| | | | | | |
| | | | | | |
| – | – | – | – | – | Porous |
| – | – | – | – | – | Porous |

FIG. 8-1

TABLE 5 (continued)

Effect of (R.E.O.) Addition

Base Composition w%: ($BaTiO_3$ + 2 BLBS FLUX + 0.2 $BaO.B_2O_3$ + 1 $Nb_2O_3$ + 0.1 $MnCO_3$)

Fired at: 975° C/3 Hrs.

| Example | Experiment | $BaTiO_3$ wt.% | R.E.O. wt.% | Density $g/cm^3$ | Grain Size um | K | % D.F. |
|---|---|---|---|---|---|---|---|
| 40 | 20-56C | 95.92 | .8 | 5.73 | <1.0 | 2400 | 1.0 |
| 41 | 20-56D | 95.72 | 1.0 | 5.81 | | 2680 | 2.0 |
| 42 | 20-56E | 95.52 | 1.2 | 5.43 | | 2185 | 2.5 |
| | | | | | | | |
| | | | $Nd_2O_3$ | | | | |
| 43 | 20-57A | 96.32 | 0.4 | <5.5 | <1.0 | – | – |
| 44 | 20-57B | 96.12 | 0.6 | <5.5 | <1.0 | – | – |
| 45 | 20-57C | 95.92 | 0.8 | <5.5 | <1.0 | – | – |

FROM FIG. 8-1

| TCC% @ | | | | | Comments |
|---|---|---|---|---|---|
| -55C | -15C | 85C | 105C | 125C | |
| -10 | -7 | 2 | 6 | 24 | |
| -29 | -16 | 53 | 33 | 22 | Solid Solution |
| -50 | -31 | 252 | 150 | 36 | Solid Solution |
| | | | | | |
| | | | | | |
| - | - | - | - | - | Porous |
| - | - | - | - | - | Porous |
| - | - | - | - | - | Porous |

TO FIG. 8-4

FROM FIG.8-1

FIG.8-3

| | | | | | | | |
|---|---|---|---|---|---|---|---|
| 46 | 20-57D | 95.72 | 1.0 | <5.5 | <1.0 | – | – |
| 47 | 20-57E | 95.52 | 1.2 | <5.5 | <1.0 | – | – |
| | | | | | | | |
| | | | $Yb_2O_3$ | | | | |
| 48 | 20-58A | 96.32 | 0.4 | <5.5 | <1.0 | – | – |
| 49 | 20-58B | 96.12 | 0.6 | <5.5 | <1.0 | – | – |
| 50 | 20-58C | 95.92 | 0.8 | <5.5 | <1.0 | – | – |
| 51 | 20-58D | 95.72 | 1.0 | <5.5 | <1.0 | – | – |
| 52 | 20-58E | 95.52 | 1.2 | <5.5 | <1.0 | – | – |
| | | | | | | | |
| | | | $ErO_3$ | | | | |
| 53 | 20-59A | 96.32 | 0.4 | <5.5 | <1.0 | – | – |
| 54 | 20-59B | 96.12 | .6 | <5.5 | <1.0 | – | – |

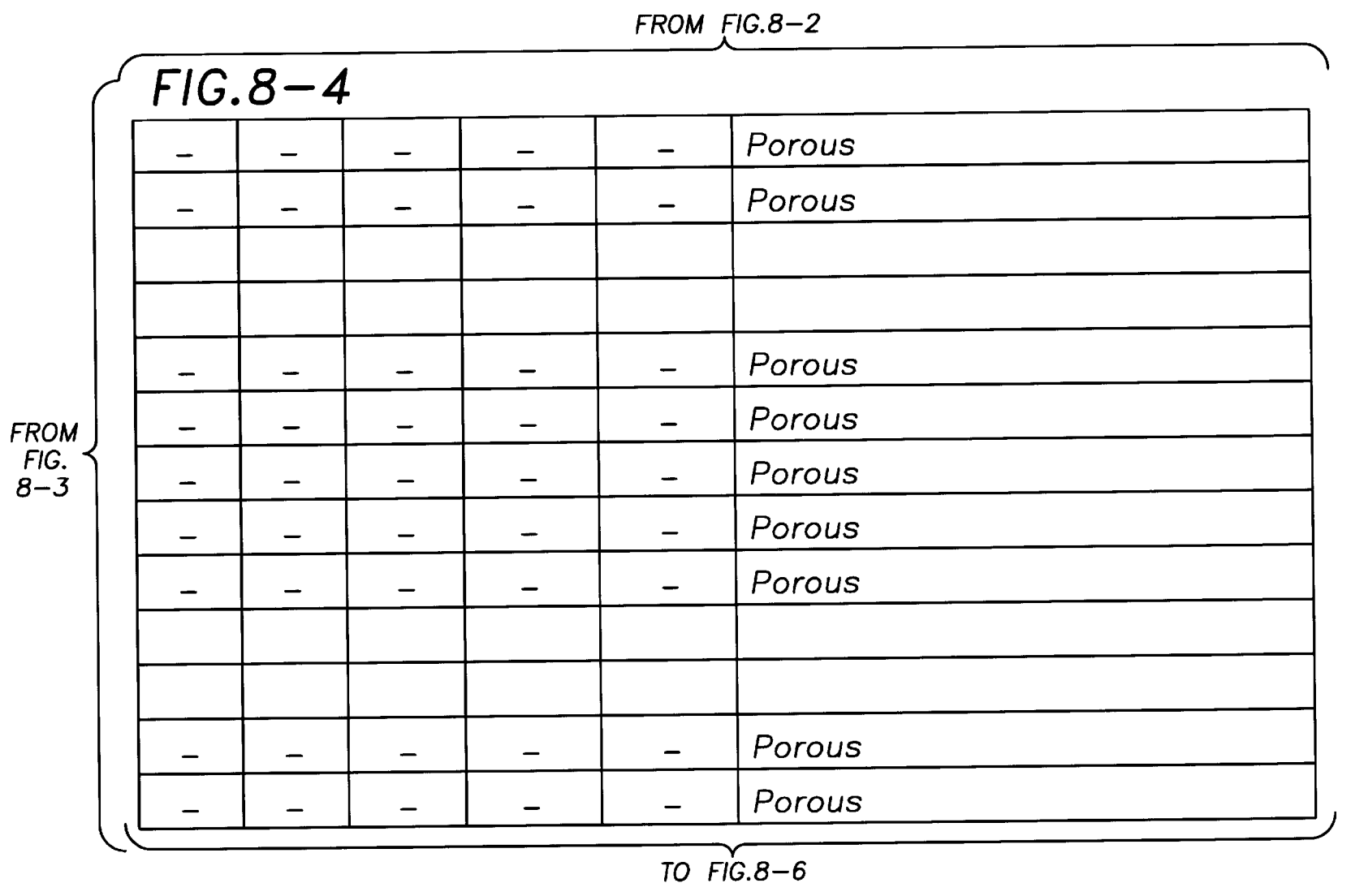

FROM FIG.8-2

FIG.8-4

FROM FIG. 8-3

| | | | | | |
|---|---|---|---|---|---|
| – | – | – | – | – | Porous |
| – | – | – | – | – | Porous |
| | | | | | |
| | | | | | |
| – | – | – | – | – | Porous |
| – | – | – | – | – | Porous |
| – | – | – | – | – | Porous |
| – | – | – | – | – | Porous |
| – | – | – | – | – | Porous |
| | | | | | |
| | | | | | |
| – | – | – | – | – | Porous |
| – | – | – | – | – | Porous |

TO FIG.8-6

FROM FIG.8-3

FIG.8-5

| | | | | | | | |
|---|---|---|---|---|---|---|---|
| 55 | 20-59C | 95.92 | .8 | <5.5 | <1.0 | – | – |
| 56 | 20-59D | 95.72 | 1.0 | <5.5 | <1.0 | – | – |
| 57 | 20-59E | 95.52 | 1.2 | <5.5 | <1.0 | – | – |
| | | | | | | | |
| | | | $DyO_3$ | | | | |
| 58 | 20-60A | 96.32 | 0.4 | <5.5 | <1.0 | – | – |
| 59 | 20-60B | 96.12 | .6 | <5.5 | <1.0 | – | – |
| 60 | 20-60C | 95.92 | .8 | <5.5 | <1.0 | – | – |
| 61 | 20-60D | 95.72 | 1.0 | 5.72 | <1.0 | 2345 | 0.84 |
| 62 | 20-60E | 95.52 | 1.2 | 5.89 | | 6550 | 53 |

TO FIG. 8-6

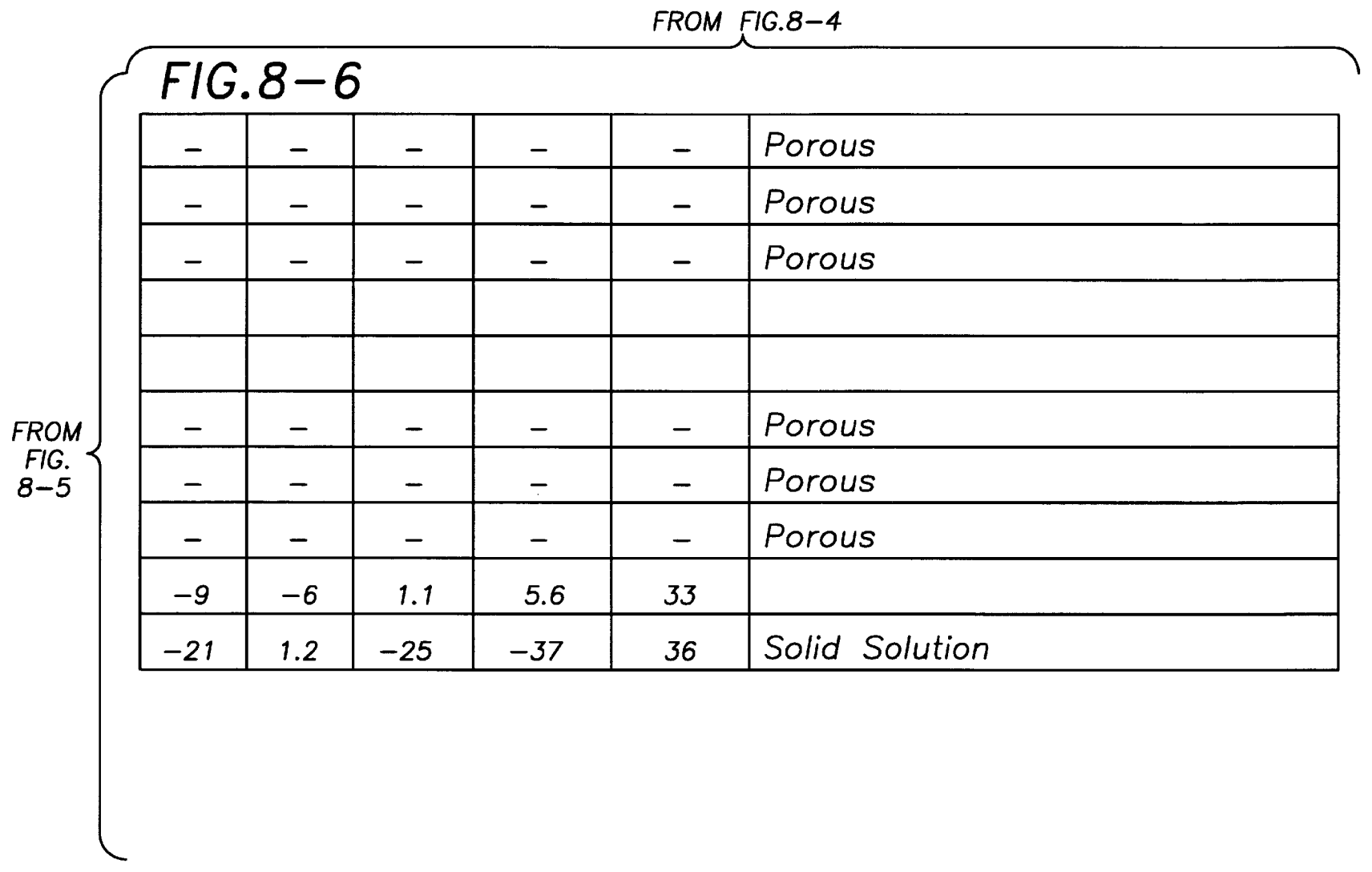

FROM FIG.8-4

FROM FIG. 8-5

FIG.8-6

| | | | | | |
|---|---|---|---|---|---|
| – | – | – | – | – | Porous |
| – | – | – | – | – | Porous |
| – | – | – | – | – | Porous |
| | | | | | |
| | | | | | |
| – | – | – | – | – | Porous |
| – | – | – | – | – | Porous |
| – | – | – | – | – | Porous |
| −9 | −6 | 1.1 | 5.6 | 33 | |
| −21 | 1.2 | −25 | −37 | 36 | Solid Solution |

FIG. 9-1

TABLE 6

Effect of ($WO_3$ and $MoO_3$) Addition

Base Composition w%: ($BaTiO_3$ + 2 BLBS FLUX + 0.8 $Gd_2O_3$ + 1$Nb_2O_5$ + 0.25 $MnCO_3$)

Fired at: 950°C/5 Hrs.

| Example | Experiment | $BaTiO_3$ wt.% | wt.% | Density g/cm$^3$ | Grain Size um | K | % D.F. |
|---|---|---|---|---|---|---|---|
| | | | | | | | |
| | | | $WO_3$ | | | | |
| 63 | 01-176A | 95.95 | 0.0 | 5.93 | 1-2 | 2900 | 1.36 |
| 64 | 01-176B | 95.75 | 0.2 | 5.90 | 1.0 | 2760 | 0.68 |
| 65 | 01-176C | 95.55 | 0.4 | 5.87 | <1.0 | 2600 | 0.62 |
| 66 | 01-176D | 95.35 | 0.6 | 5.84 | <1.0 | 2500 | 55 |
| | | | | | | | |

FROM FIG. 9-1

| TCC% @ | | | | | Comments |
|---|---|---|---|---|---|
| -55C | -15C | 85C | 105C | 125C | |
| | | | | | |
| | | | | | |
| -21 | -10 | 36 | 7 | -11 | Partial Solid Solution |
| -10 | -5 | -7 | -13 | -10 | Core-Shell |
| -9 | -6 | -7 | -8 | -1 | Core-Shell |
| -10 | -6 | -5 | -6 | 1.5 | Core-Shell |
| | | | | | |

TO FIG.9-4

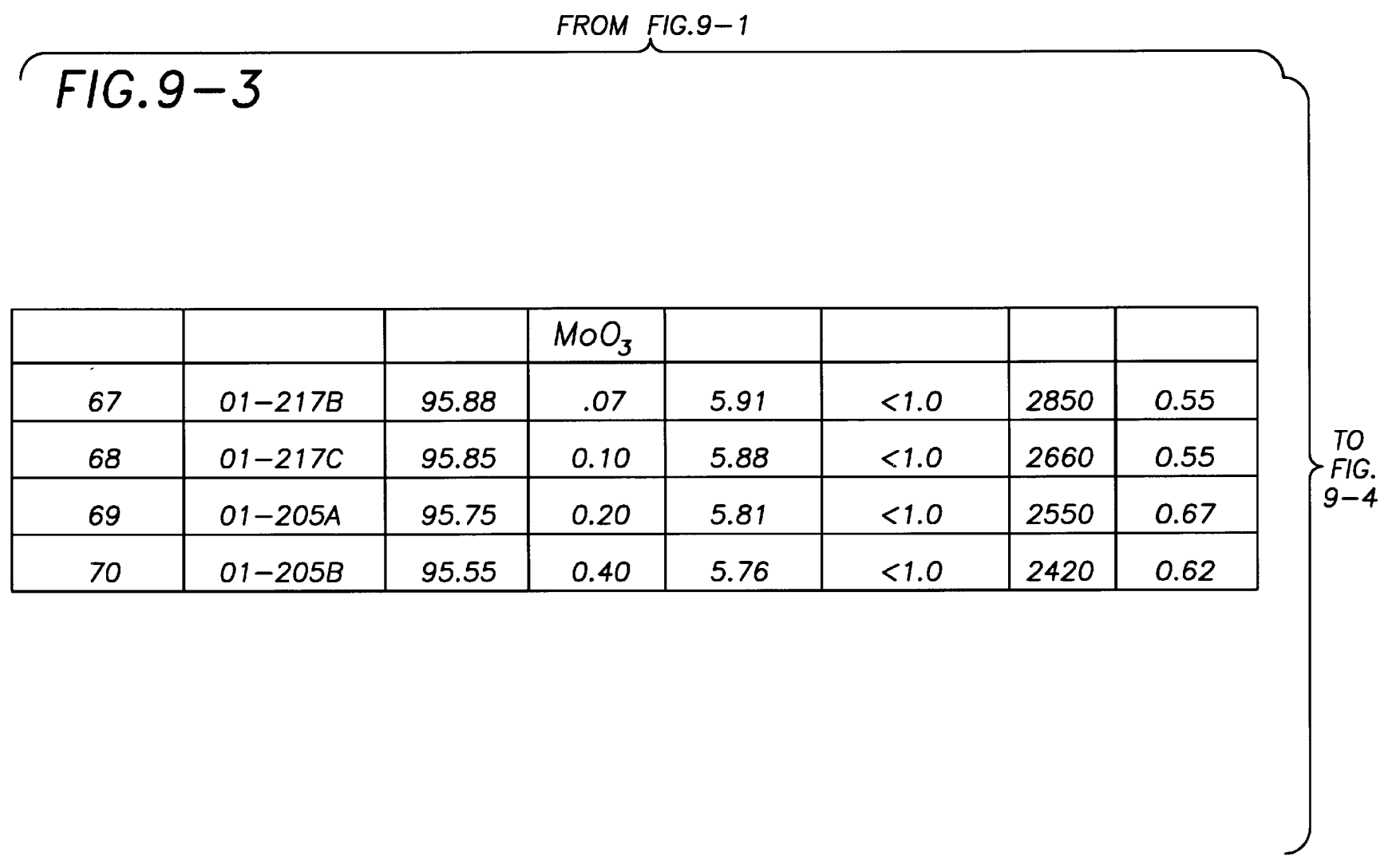

FROM FIG.9–1

FIG.9–3

| | | | $MoO_3$ | | | | |
|---|---|---|---|---|---|---|---|
| 67 | 01–217B | 95.88 | .07 | 5.91 | <1.0 | 2850 | 0.55 |
| 68 | 01–217C | 95.85 | 0.10 | 5.88 | <1.0 | 2660 | 0.55 |
| 69 | 01–205A | 95.75 | 0.20 | 5.81 | <1.0 | 2550 | 0.67 |
| 70 | 01–205B | 95.55 | 0.40 | 5.76 | <1.0 | 2420 | 0.62 |

TO FIG. 9–4

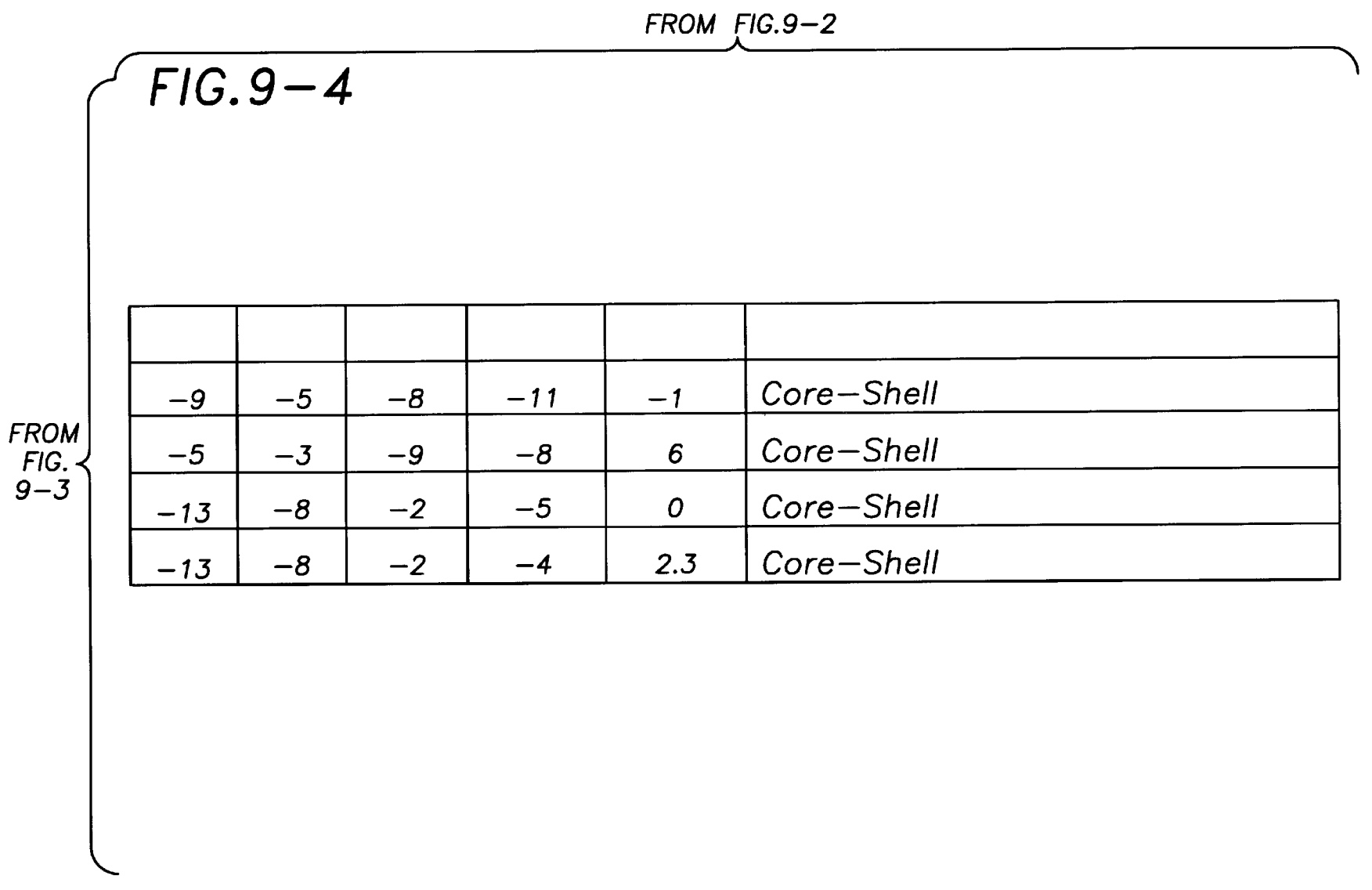

FROM FIG. 9–2

FIG. 9–4

FROM FIG. 9–3

| | | | | | |
|---|---|---|---|---|---|
| | | | | | |
| –9 | –5 | –8 | –11 | –1 | Core–Shell |
| –5 | –3 | –9 | –8 | 6 | Core–Shell |
| –13 | –8 | –2 | –5 | 0 | Core–Shell |
| –13 | –8 | –2 | –4 | 2.3 | Core–Shell |

FIG. 10-1

TABLE 7

Effect of ($Mg_2TiO_4$ and $V_2O_5$) Additions

Base Composition w%: ($BaTiO_3$ + 2 BLBS FLUX + 0.8 $Gd_2O_3$ + 1$Nb_2O_5$+0.25 $MnCO_3$)

Fired at: 975° C/5 Hrs.

| Example | Experiment | $BaTiO_3$ wt.% | wt.% | Density $g/cm^3$ | Grain Size um | K | % D.F. |
|---|---|---|---|---|---|---|---|
| | | | | | | | |
| | | | $Mg_2TiO_4$ | | | | |
| 71 | 01-149A | 95.95 | 0.0 | 5.92 | <1.0 | 2920 | 0.6 |
| 72 | 01-149B | 95.85 | 0.10 | 5.70 | <1.0 | 2630 | 0.6 |
| 73 | 01-149C | 95.75 | 0.20 | 5.60 | <1.0 | 2250 | 0.6 |
| 74 | 01-149D | 95.55 | 0.4 | <5.5 | <1.0 | – | – |
| | | | | | | | |

FROM FIG. 10-1

| TCC% @ | | | | | Comments |
| --- | --- | --- | --- | --- | --- |
| -55C | -15C | 85C | 105C | 125C | |
| | | | | | |
| | | | | | |
| -7 | -4 | -7 | -11 | -4 | Core-Shell |
| -11 | -8 | -9 | -11 | -2 | Core-Shell |
| -18 | -12 | -10 | -10 | -9 | Slight Porousity |
| - | - | - | - | - | Porous |
| | | | | | |

TO FIG. 10-4

FROM FIG.10-1

FIG.10-3

| | | | $V_2O_5$ | | | | |
|---|---|---|---|---|---|---|---|
| 75 | 01-105B | 95.85 | 0.10 | 5.88 | <1.0 | 2480 | 0.55 |
| 76 | 01-105C | 95.75 | 0.20 | 5.83 | <1.0 | 2410 | 0.52 |
| 77 | 01-105D | 95.65 | 0.4 | 5.92 | <1.0 | 2710 | 0.56 |

TO FIG. 10-4

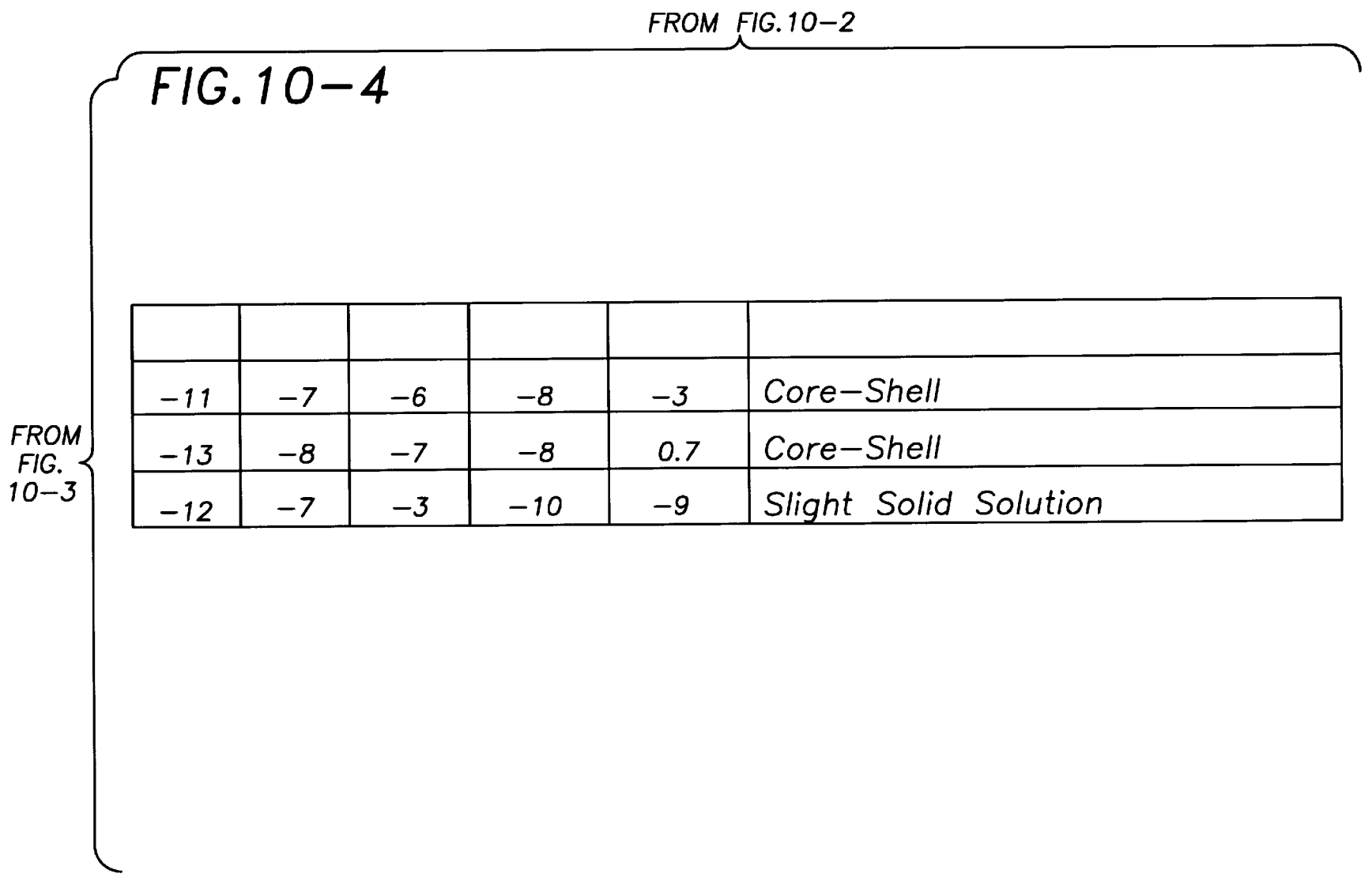

FROM FIG. 10-2

FIG. 10-4

FROM FIG. 10-3

| | | | | | |
|---|---|---|---|---|---|
| −11 | −7 | −6 | −8 | −3 | Core−Shell |
| −13 | −8 | −7 | −8 | 0.7 | Core−Shell |
| −12 | −7 | −3 | −10 | −9 | Slight Solid Solution |

FIG. 11-1

TABLE 8

Effect of (BLBS) Addition on Firing Temperature

Base Composition w%: (98.1 $BaTiO_3$ + 1.0 $Nb_2O_5$ + 0.8 $Gd_2O_3$ + 0.1 $MnCO_3$)

Fired at: 900, 950 and 975°C/3 Hrs.

| Example | Experiment | Firing Temp. °C | wt.% | Density g/cm$^3$ | Grain Size um | K | % D.F. |
|---|---|---|---|---|---|---|---|
| | | | | | | | |
| 78 | 01-05B | 900 | 1.25 | <5.5 | <1.0 | – | – |
| 79 | 01-05A | 900 | 1.50 | <5.5 | <1.0 | – | – |
| 80 | 01-01A | 900 | 1.75 | 5.77 | <1.0 | 2520 | 0.68 |
| 81 | 01-01B | 900 | 2.0 | 5.78 | <1.0 | 2420 | 0.75 |
| 82 | 01-01C | 900 | 2.25 | 5.87 | <1.0 | 2890 | 1.55 |
| 83 | 01-01D | 900 | 2.50 | 5.89 | 1-2 | 2970 | 2.0 |
| | | | | | | | |

FROM FIG. 11-1

| TCC% @ | | | | | Comments |
|---|---|---|---|---|---|
| −55C | −15C | 85C | 105C | 125C | |
| | | | | | |
| – | – | – | – | – | Porous |
| – | – | – | – | – | Porous |
| −3 | −1.0 | −6 | −5 | 1 | Core-Shell |
| −4 | −2 | −4 | −4 | 1.7 | Core-Shell |
| −14 | −7 | −7 | −11 | −11 | Start of Solid Solution |
| −21 | −12 | 1 | −11 | −16 | Solid Solution |
| | | | | | |

TO FIG. 11-4

FROM FIG.11-1

FIG.11-3

| | | | | | | | |
|---|---|---|---|---|---|---|---|
| 84 | 01-05B | 950 | 1.25 | 5.77 | <1.0 | 2850 | 0.8 |
| 85 | 01-05A | 950 | 1.50 | 5.79 | <1.0 | 2950 | .92 |
| 86 | 01-01A | 950 | 1.75 | 5.89 | 1-2 | 3340 | 1.37 |
| 87 | 01-01B | 950 | 2.0 | 5.89 | 1-2 | 3560 | 2.0 |
| 88 | 01-01C | 950 | 2.25 | 5.89 | 1-2 | 4100 | 8 |
| 89 | 01-01D | 950 | 2.50 | 5.90 | 1-2 | 4100 | 6 |
| | | | | | | | |
| 90 | 01-05B | 975 | 1.25 | 5.79 | <1.0 | 2850 | 0.68 |
| 91 | 01-05A | 975 | 1.50 | 5.87 | <1.0 | 3150 | .87 |

TO FIG. 11-4

FROM FIG. 11-2

FIG. 11-4

| | | | | | |
|---|---|---|---|---|---|
| −13 | −8 | −5 | −8 | −5 | Core−Shell |
| −14 | −8 | −4 | −9 | −8 | Core−Shell |
| −19 | −10 | 5 | −11 | −20 | Solid Solution |
| −30 | −14 | 45 | 3 | −22 | Solid Solution |
| −42 | −18 | 51 | 20 | 9 | Solid Solution |
| −29 | −14 | 11 | −10 | −20 | Solid Solution |
| | | | | | |
| −15 | −9 | −5 | −9 | −7 | Core−Shell |
| −16 | −9 | 0.4 | −12 | −17 | Start of Solid Solution |

FROM FIG. 11-3

FIG. 12-1

TABLE 9

Effect of (Other) Additions

Base Composition w%: (BaTiO: + 2 BLBS $+0.8Gd_2O_3$ $+0.1$ $MnCO_3$)

Fired at: 950°C/3 Hrs.

| Example | Experiment | $BaTiO_3$ wt.% | wt.% | Density $g/cm^3$ | Grain Size um | K | % D.F. |
|---|---|---|---|---|---|---|---|
| | | | | | | | |
| | | | $ZrO_2$ | | | | |
| 92 | 99-386A | 96.9 | 0.2 | 5.92 | <1.0 | 2275 | 0.81 |
| 93 | 99-386B | 96.7 | 0.4 | 5.57 | 1-5 | 1650 | .92 |
| 94 | 99-386C | 96.5 | 0.6 | 5.52 | 1-5 | 1920 | 1.7 |
| | | | | | | | |
| | | | $Sb_2O_3$ | | | | |
| 95 | 99-376A | 96.9 | 0.2 | 5.86 | 1-5 | 1880 | 0.81 |
| 96 | 99-376B | 96.7 | 0.4 | 5.36 | 1-5 | 1785 | 2.0 |
| 97 | 99-376C | 96.5 | 0.6 | 5.49 | 1-5 | 2850 | 2.3 |

| TCC% @ | | | | | Comments |
|---|---|---|---|---|---|
| -55C | -15C | 85C | 105C | 125C | |
| | | | | | |
| | | | | | |
| -27 | -10 | 25 | 97 | 90 | Solid Solution |
| -37 | -18 | 29 | 129 | 204 | Solid Solution |
| -37 | -19 | 34 | 160 | 165 | Solid Solution |
| | | | | | |
| | | | | | |
| -34 | -10 | 46 | 323 | 120 | Solid Solution |
| -37 | -9 | 83 | 247 | 81 | Solid Solution |
| -33 | -14 | 61 | 23 | 35 | Solid Solution |

FROM FIG. 12-1

FIG. 13-1

TABLE 10

Base Composition in w%: 96.24 $BaTiO_3$ + 2.5 BLBS + 1.2 $Nb_2O_3$ + 0.8 $Gd_2O_3$ Internal Electrode: 85 Ag/15 Pd

| Example | Sample | Additive wt.% | Firing Conditions °C | K | % D.F. | Dielectric Breakdown V/mil |
|---|---|---|---|---|---|---|
| 98 | LT-735 | 0.1 $MnCO_3$ | 975/3H. | 3000 | 0.92 | 1300 |
| | | * | | | | |
| 99 | LT-743 | 0.2 $MnCO_3$ | 950 | 3000 | 1.12 | 1590 |
| | | | 975 | 3400 | 1.52 | 1250 |
| | | | 1000 | 3800 | 1.8 | 1150 |

FROM FIG. 13-1

MLC Structure: (3x2.5mm)-3 Layers at 25 microns

| TCC% at | | | Insulation Resistance at 300V. 125C (ohm-farad) | | | Comments |
|---|---|---|---|---|---|---|
| -55C | 85C | 125C | 1.Hr. | 24 Hrs. | 100 Hrs. | |
| 4 | -5 | 1.0 | 100 | 450 | 30/48 H. | I.R. Degradation |
| * | | | | | | * |
| -6 | -10 | -14 | 360 | 360 | 360/500 H. | |
| -8 | -18 | -22 | 360 | 360 | 360/175 H. | |
| -15 | -8 | -32 | 360 | 360 | 360/500 H. | Some Solid Solution |

FIG. 14-1

TABLE 11

Base Composition in wt%:96.2 $BaTiO_3$
+ 2 BLBS −1$Nb_2O_3$+0.8 $Gd_2O_3$

Internal Electrode: 85 Ag/15 Pd

| Example | Sample | Additive wt.% | Firing Conditions °C | K | % D.F. | Dielectric Breakdown V/mil |
|---|---|---|---|---|---|---|
| 100 | LT-755 | 0.2$MnCO_3$<br>0.2 $ZrO_2$ | 975 | 3800 | 1.65 | 2100 |
| | | | | | | |
| 101 | LT-766 | 0.2$MnCO_3$<br>0.15$TiO_2$ | 1000 | 3560 | 1.5 | 1880 |

FROM FIG. 14-1

MLC Structure: (3.0 x 2.5mm)-10 Layers at 25 microns

| TCC% at | | | Insulation Resistance at 300V. 125C (ohm-farad) | | | Comments |
|---|---|---|---|---|---|---|
| -55C | 85C | 125C | 1.Hr. | 24 Hrs. | 100 Hrs. | |
| -4 | -15 | -18 | 420 | 420 | 430/500 H. | |
| | | | | | | |
| -4 | -13 | -12 | 280 | 280 | 280/500 H. | |

FIG. 15-1

TABLE 12

Base Composition in wt%: 96.20 $BaTiO_3$ + 2 BLBS $-1Nb_2O_3+0.8\ Gd_2O_3$

Internal Electrode: 85 Ag/15 Pd

| Example | Sample | Additive wt.% | Firing Conditions °C | K | % D.F. | Dielectric Breakdown V/mil |
|---|---|---|---|---|---|---|
| 102 | *LT-774 | 0.25$MnCO_3$ | 950 | 3350 | 1.6 | 1860 |
| | | | *975 | 3670 | 2.5 | 1230 |
| | | | | | | |
| 103 | **LT-777 | 0.25$MnCO_3$ | 975 | 3490 | 1.4 | 1940 |
| | | 0.2$BaO.B_2O_3$ | 1000 | 4100 | 1.6 | 1450 |
| | | 0.2$ZrO_2$ | | | | |

MLC Structure: *(3 x 2.5mm)−10 Layers at 15 microns
**(2 x 1.25mm)−22 Layers at 15 microns

FROM FIG. 15−1

| TCC% at | | | Insulation Resistance at 150V, 125C (ohm−farad) | | | Comments |
|---|---|---|---|---|---|---|
| −55C | 85C | 125C | 1.Hr. | 24 Hrs. | 100 Hrs. | |
| −5<br>−10 | −7<br>−2 | −14<br>−23 | 290<br>440 | 290<br>440 | 290/260 H.<br>440/280 H. | |
| | | | | | | |
| 1<br>2 | −14<br>−20 | −12<br>−21 | 140<br>210 | 140<br>210 | 130<br>210 | |

TO FIG. 15−4

FROM FIG.15-1

FIG. 15-3

| | | | | | | |
|---|---|---|---|---|---|---|
| | | | | | | |
| 104 | **LT-783 | $0.25MnCO_3$<br>$0.15V_2O_3$ | 975<br>1000 | 2850<br>2930 | 1.0<br>1.0 | 1900<br>1970 |
| | | | | | | |
| 105 | **LT-787 | $0.25MnCO_3$<br>$0.6\ Mg_2TiO_3$ | 975<br>1000<br>1025 | 3330<br>3630<br>2500 | 3.0<br>1.5<br>1.1 | 1050<br>1210<br>1760 |

TO FIG. 15-4

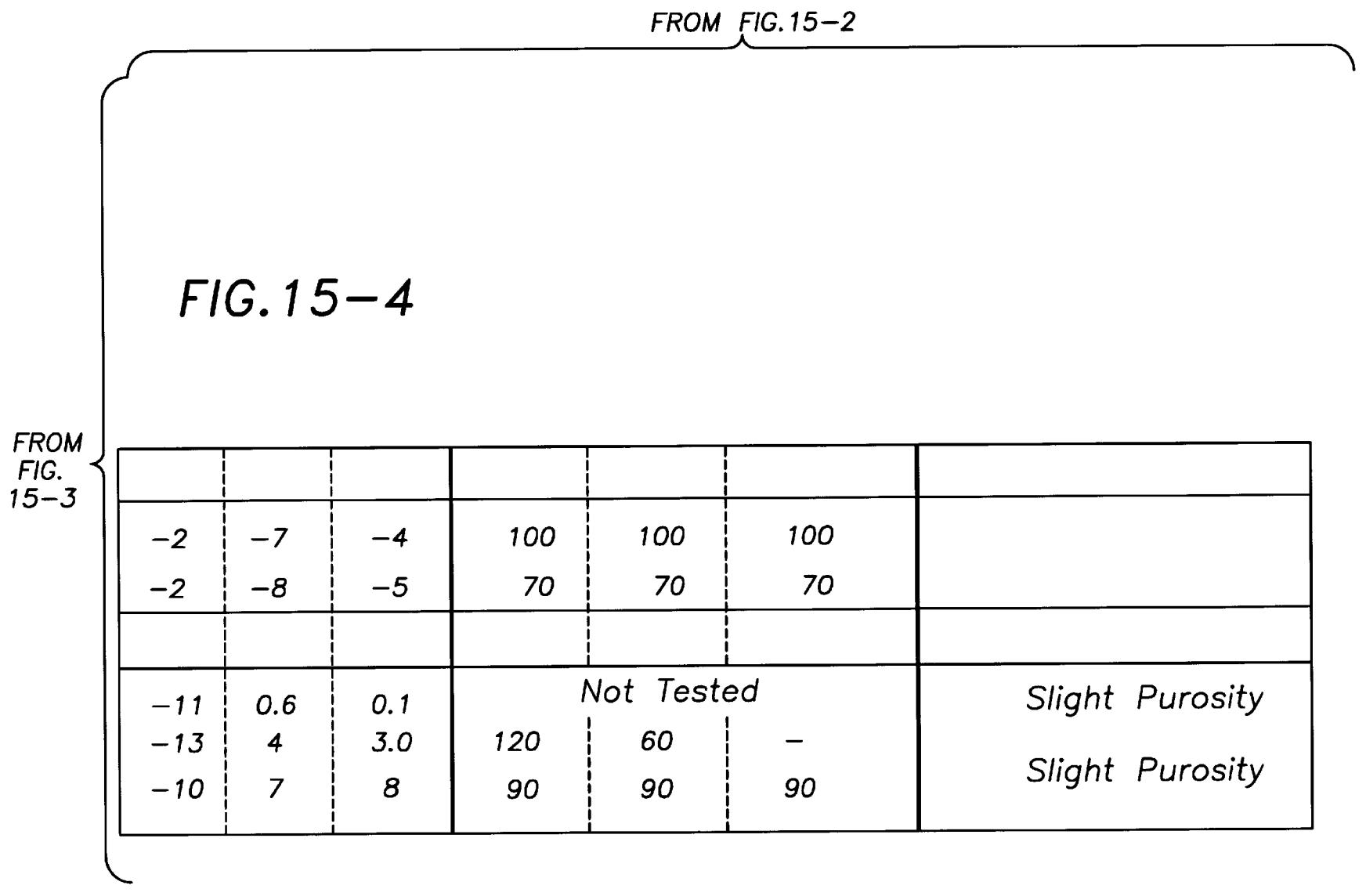

FROM FIG.15–2

FIG.15–4

FROM FIG. 15–3

| | | | | | | |
|---|---|---|---|---|---|---|
| | | | | | | |
| −2<br>−2 | −7<br>−8 | −4<br>−5 | 100<br>70 | 100<br>70 | 100<br>70 | |
| | | | | | | |
| −11<br>−13<br>−10 | 0.6<br>4<br>7 | 0.1<br>3.0<br>8 | Not Tested<br>120<br>90 | 60<br>90 | –<br>90 | Slight Purosity<br>Slight Purosity |

FIG. 16-1

TABLE 13

Base Composition in wt%: 95.5 $BaTiO_3$ + 2 BLBS + 1 $Nb_2O_3$ + 0.8 $Gd_2O_3$ + 0.25 $MnCO_3$ Internal Electrode: 85 Ag/15 Pd

| Example | Sample | Additive wt.% | Firing Conditions °C | K | % D.F. | Dielectric Breakdown V/mil |
|---|---|---|---|---|---|---|
| 106 | LT-842 | 0.4 $WO_3$ | 950 | 3170 | 1.40 | 1420 |
| | | | 975 | 3500 | 1.8 | 1250 |
| | | | | | | |
| 107 | LT-849 | 0.6 $WO_3$ | 975<br>1000 | 2900<br>3260 | 1.2<br>1.4 | 2600<br>2460 |

FROM FIG. 16-1

MLC Structure: (2.0x1.25mm)-22 Layers at 15 microns

| TCC% at | | | Insulation Resistance at 300V. 125C (ohm-farad) | | | Comments |
|---|---|---|---|---|---|---|
| -55C | 85C | 125C | 1Hr. | 24 Hrs. | 100 Hrs. | |
| -3 | -13 | -15 | 150 | 150 | 150 | |
| -10 | -8 | 0.7 | 250 | 250 | 250 | |
| | | | | | | |
| 3<br>9 | -11<br>-14 | -2<br>-6 | 75<br>70 | 50<br>60 | 10/48 H.<br>- | Some Degradation<br>Some Degradation |

FIG. 17-1

TABLE 14
Effect of ($Nd_2O_3$) Addition
Base Composition w%: BTZ + 2 BLBS Flux + 0.1 $MnCO_3$
Fired at: 950°C

| Example | Experiment | $BaTiO_3$ wt.% | $Nd_2O_3$ wt.% | Density g/cm$^3$ | Grain Size um | K | % D.F. |
|---|---|---|---|---|---|---|---|
| 108 | 99-353A | 97.4 | 0.5 | 5.96 | 2-3 | 3150 | 0.32 |
| 109 | 99-353B | 96.9 | 1.0 | 5.99 | <1 | 2640 | 0.49 |
| 110 | 99-353C | 96.4 | 1.5 | 5.99 | <1 | 1940 | 0.52 |

FIG. 18-1

TABLE 15
Base Composition w%: 97.25 BTZ + 0.5 $Nd_2O_3$ + 1.5 BLBS + 0.2$MnCO_3$
Internal Electrode: 70 Ag/30 Pd

| Example | Sample | Firing Conditions | K | % D.F. | Dielectric Breakdown V/mil |
|---|---|---|---|---|---|
| 111 | LT-463 | 1000°C | 7800 | 1.1 | 670 |

TO FIG. 17-2 18-2

FROM FIG. 17-1 18-1

FIG. 17-2

| TCC% @ | | | | | Curie Temperature °C | Comments |
|---|---|---|---|---|---|---|
| -30C | -15C | 45C | 65C | 85C | | |
| -55 | -35 | -28 | -55 | -70 | +15 | |
| 7 | 10 | -12 | -26 | -40 | -10 | |
| 11 | 10 | -7 | -18 | -32 | -30 | |

FIG. 18-2

MLC Structure: (3 x 2.5mm)- 10Layers at 30 Microns

| TCC% @ | | Insulation Resistance at 150V, 125C (ohm-farad) | | | Comments |
|---|---|---|---|---|---|
| -55C | 85C | 1 Hr. | 24 Hrs. | 200 Hrs. | |
| -55 | -35 | >1000 | >1000 | >1000 | |

HIGH DIELECTRIC CONSTANT VERY LOW FIRED X7R CERAMIC CAPACITOR, AND POWDER FOR MAKING

CROSS REFERENCE TO RELATED APPLICATION

This Application is a continuation-in-part of Applicant's patent application Ser. No. 09/652,562 filed on Aug. 31, 2000 now U.S. Pat. No. 6,309,995.

FIELD OF THE INVENTION

This invention relates to multilayer ceramic capacitors and formulated ceramic powders for making the capacitors that meet X7R performance characteristics of the Electronic Industrial Association ("E.I.A."), and in particular relates to a formulated ceramic powder from which there can be made a dielectric ceramic body that can be sintered at or below 1,025° C. to permit the usage of a high silver content silver-palladium alloy electrode having an 85 weight percent or greater silver composition.

BACKGROUND OF THE INVENTION

Efforts to produce low fired, high dielectric constant, X7R multilayer ceramic capacitors and formulated ceramic powder for making the capacitors are well known. For example, dielectric ceramic compositions that lead to a mature dielectric body with standard X7R performance characteristics and a high dielectric constant afer firing or sintering at about 1,100° C. are disclosed in several patents by one of the present inventors, Galeb Maher. Those patents include U.S. Pat. No. 5,010,443 that issued on Apr. 23, 1991 to Maher, U.S. Pat. No. 5,258,338 that issued on Nov. 2, 1993 to Maher, and U.S. Pat. No. 6,043,174 that issued on Mar. 28, 2000 to Maher et al., all of which patents are hereby incorporated herein by reference and all of which are assigned to the same assignee that is also the assignee of all rights in the present invention disclosed and claimed herein.

In the aforesaid U.S. Pat. No. 6,043,174 to Maher et al., a highly acceptable X7R formulated ceramic powder mixture is described that may be sintered after formulation at a temperature as low as 1,120° C. in order to permit usage of electrodes consisting of 70% silver and 30% palladium. The ceramic powder mixture disclosed in the 6,043,174 Patent comprises at least ninety weight percent ("wt %") pure barium titanate powder having an average particle size of from 0.4 to 0.7 microns, from 1.5 to 2.5 wt % of a cadmium silicate powder flux, a small amount of a grain growth inhibitor compound, such as 0.89 to 2.72 mole percent $Nb_2O_5$, and also about 0.2 to 1.0 mole percent calcium cations relative to the amount of barium titanate. Multilayer ceramic capacitors made from such a composition are currently being made and sold in the industry, and formulated ceramic powders made according to the disclosures in U.S. Pat. No. 6,043,174 are being sold by the assignee of the present invention, MRA Laboratories, Inc., of Adams, Mass., U.S.A.

Such ceramic powders and multilayer ceramic capacitors made from those powders have achieved high performance characteristics while reducing an amount of palladium within an electrode. As is well known, the high cost of palladium has made it desirable to decrease an amount of palladium and to increase an amount of silver in a silver-palladium alloy electrode. By decreasing a sintering temperature at which the ceramic powder is converted from a powder into a cohesive solid or mature body without melting the powder, the relative amount of silver in the silver-palladium electrode may be increased while the amount of palladium may be decreased. As indicated above, the ceramic powders disclosed in the 6,043,174 Patent enabled sintering at a temperature of between 1,120° C. to 1,150° C. so that the amount of palladium in the electrodes could be reduced to 30 percent. It is understood in the art that the sintering temperature of the ceramic powder must be below the melting temperature of the silver-palladium electrode. Additionally, as the proportion of silver in the electrode is increased and the proportion of palladium in the electrode is decreased, the melting temperature of the electrode is decreased. Therefore, by lowering the sintering temperature of the ceramic powder, a greater proportion of silver and smaller proportion of palladium may be utilized in making the electrode to effect a significant cost saving due to the substantially higher cost of palladium compared to the cost of silver.

The aforesaid Patents also disclose further research efforts of the inventors herein to decrease costs and enhance performance characteristics of formulated ceramic powders for multilayer capacitors. For example, U.S. Pat. No. 6,043,174 also discloses that by addition of a very small and critical quantity of calcium compound such as calcium carbonate or calcium niobate to the start powder, a costly anneal step may be eliminated while maintaining a high insulation resistance in an accelerated life test with only a very small reduction of dielectric constant.

While known formulated ceramic powders and multilayer capacitors made from the powders demonstrate improved performance, nonetheless existing powders still suffer from significant limitations. For example, it is known to use heavy metal oxides such as CdO, PbO and $Bi_2O_3$ in the powders as a flux. The advantages of use of cadmium silicate flux in multilayer capacitors were first disclosed by one of the inventors herein in U.S. Pat. No. 4,266,265 that issued on May 5, 1981 to Galeb Maher. However, such heavy metal compounds as cadmium oxide are increasingly considered hazardous materials, and hence they pose significant cost problems related to usage and disposal of components utilizing capacitors that include cadmium or other hazardous heavy metal oxides. Additionally, as disclosed in the aforesaid patents, in sintering ceramic powders including a cadmium silicate flux, a closed crucible must be used to contain any toxic cadmium fumes from contaminating persons in the vicinity of the crucible.

Accordingly, there is a need for a multilayer ceramic capacitor and powder for making the capacitor that does not include hazardous heavy metal oxides, and that reduces costs of known capacitors.

SUMMARY OF THE INVENTION

The invention includes a dielectric ceramic powder mixture comprising at least ninety weight percent essentially pure barium titanate powder having an average particle size of from 0.2 to 1.2 microns; from 0.2 to 2.5 weight percent of barium lithium borosilicate ("BLBS") flux; from 0.1 to 0.3 weight percent of $MnCO_3$; a grain growth inhibitor such as niobium oxide or a niobate compound so that when added to the powder mixture the niobium oxide or niobate compound yield between 0.4 to 1.50 weight percent $Nb_2O_5$; and, 0.4 to 1.2 weight percent of $Gd_2O_3$.

As a result of exhaustive research and experimentation, it was discovered by the inventors that the rare earth oxide of gadolinium produced unexpected and highly desirable results in yielding a fine grain structure, and that when combined with $Nb_2O_5$ or a niobate compound as a grain growth inhibitor, a desirable core-shell structure known in the art is obtained that demonstrates excellent X7R performance characteristics after firing or sintering at as low a temperature as 950° C.

An additional aspect of the invention includes a method of making the preferred dielectric ceramic powder, which includes the steps of preparing the above described mixture of start powders including the 0.4 to 1.2 weight percent of $Gd_2O_3$; mildly calcining the start powder mixture at about 450° C. to about 550° C. to obtain a powder comprised of agglomerates of the mixture of start powders wherein each of the agglomerates has essentially the same compositional ratios as the start powder of the barium titanate, barium lithium borosilicate, $Nb_2O_5$, $MnCO_3$, and gadolinium oxide ($Gd_2O_3$); in order to provide a powdered mixture capable of being sintered in an open zirconia setter at from 950° C. to 1,025° C. to produce a dielectric ceramic body yielding a fired density greater than 5.75 g/cm$^3$ a dielectric constant ("K") greater than 2,500, and a smooth temperature coefficient of capacitance ("TCC") wherein the K will be within +/−15% relative to 25° C. temperature values within a temperature range of between −55° C. to 125° C.

Another aspect of this invention includes a method for making a multilayer ceramic capacitor body that satisfies X7R performance characteristics that includes the steps of forming a slurry of the above described calcined start powder mixture including the 0.4 to 1.2 weight percent of $Gd_2O_3$, by a dispersion of the mixture in a binder-solvent-dispersion system; preparing layers of the slurry; drying the layers; forming a stack of a plurality of the layers and interleaving patterned films of silver-palladium electrode ink between successive adjacent pairs of layers; and then heating to mature the stack of layers by sintering in open air at a temperature of between 950° C. to 1,0250° C. for between 3 to 5 hours to produce a dense ceramic capacitor body with buried electrodes.

The multilayer ceramic capacitor made by that method demonstrates the aforesaid favorable X7R performance characteristics of K greater than 2,500, and a smooth temperature coefficient of capacitance ("TCC") wherein the K will be within +/−15% between −55° C. to 125° C., a dissipation factor ("DF") of less than 2.5 percent, an insulation resistance greater than 100 ohms-farads at 125° C., and long term stability during a life test at elevated temperatures and voltages.

It is therefore an object of this invention to provide a very low fired, high dielectric constant ceramic capacitor and the powder for making the capacitor that includes a gadolinium oxide additive and includes no heavy metal oxides. The resulting powder and ceramic capacitor has smooth X7R performance characteristics, may be fired or sintered at temperatures between 950° C. to 1,025° C., and includes no hazardous waste products thereby minimizing manufacture and disposal costs, while permitting usage of a high silver content silver-palladium electrode having a sliver content in excess of 85 percent.

These and other objects and advantages of this invention will become more readily apparent when the following description is read in conjunction with the a accompanying drawings.

BRIEF DESCRIPTION OF THE DRAWINGS

FIG. 3 is Table 1 showing research performance data of Examples 1–7 of ceramic powder formulations fired at 950° C. for 3 hours.

FIG. 4 is Table 2 showing research performance data of Examples 8–14 of ceramic powder formulations fired at 950° C. for 3 hours.

FIG. 5 is Table 3 showing research performance data of Examples 15–19 of ceramic powder formulations fired at 950° C. for 3 hours.

FIG. 6 is Table 4 showing research performance data of Examples 20–24 of ceramic powder formulations fired at 950° C. for 3 hours.

FIG. 7 is a first part of Table 5 showing research performance data of Examples 25–39 of ceramic powder formulations fired at 975° C. for 3 hours.

FIG. 8 is a second part of Table 5 showing research performance data of Examples 40–62 of ceramic powder formulations fired at 975° C. for 3 hours.

FIG. 9 is Table 6 showing research performance data of Examples 63–70 of ceramic powder formulations fired at 950° C. for 3 hours.

FIG. 10 is Table 7 showing research performance data of Examples 71–77 of ceramic powder formulations fired at 975° C. for 3 hours.

FIG. 11 is Table 8 showing research performance data of Examples 78–91 of ceramic powder formulations fired at 900, 950 and 975° C. for 3 hours.

FIG. 12 is Table 9 showing research performance data of Examples 92–97 of ceramic powder formulations fired at 950° C. for 3 hours.

FIG. 13 is Table 10 showing research performance data of Examples 98–99 of multilayer ceramic capacitor structures having 85% Silver—15% Palladium internal electrodes fired at varying temperatures for 3 hours.

FIG. 14 is Table 11 showing research performance data of Examples 100–101 of multilayer ceramic capacitor structures having 85% Silver—15% Palladium internal electrodes fired at varying temperatures for 3 hours.

FIG. 15 is Table 12, showing research performance data of Examples 102–105 of multilayer ceramic capacitor structures having 85% Silver—15% Palladium internal electrodes fired at varying temperatures for 3 hours.

FIG. 16 is Table 13, showing research performance data of Examples 106–107 of multilayer ceramic capacitor structures having 85% Silver—15% Palladium internal electrodes fired at varying temperatures for 3 hours.

FIG. 17 is Table 14, showing research performance data of Examples 108–110 of ceramic powder formulations fired at 950° C.

FIG. 18 is Table 15, showing research performance data of Example 111 of a multilayer ceramic capacitor structure having a 70% Silver—30% Palladium internal electrode fired at 1,000° C.

DETAILED DESCRIPTION OF THE PREFERRED EMBODIMENTS

The preferred embodiments of a ceramic powder mixture resulted from extensive experimentation that will be described herein. The preferred ceramic powder formulations were developed by testing at least 97 examples in the form of experimental monolayer structures. Performance data of examples 1–97 are reported in Tables 1–Table 9

Figure 1:
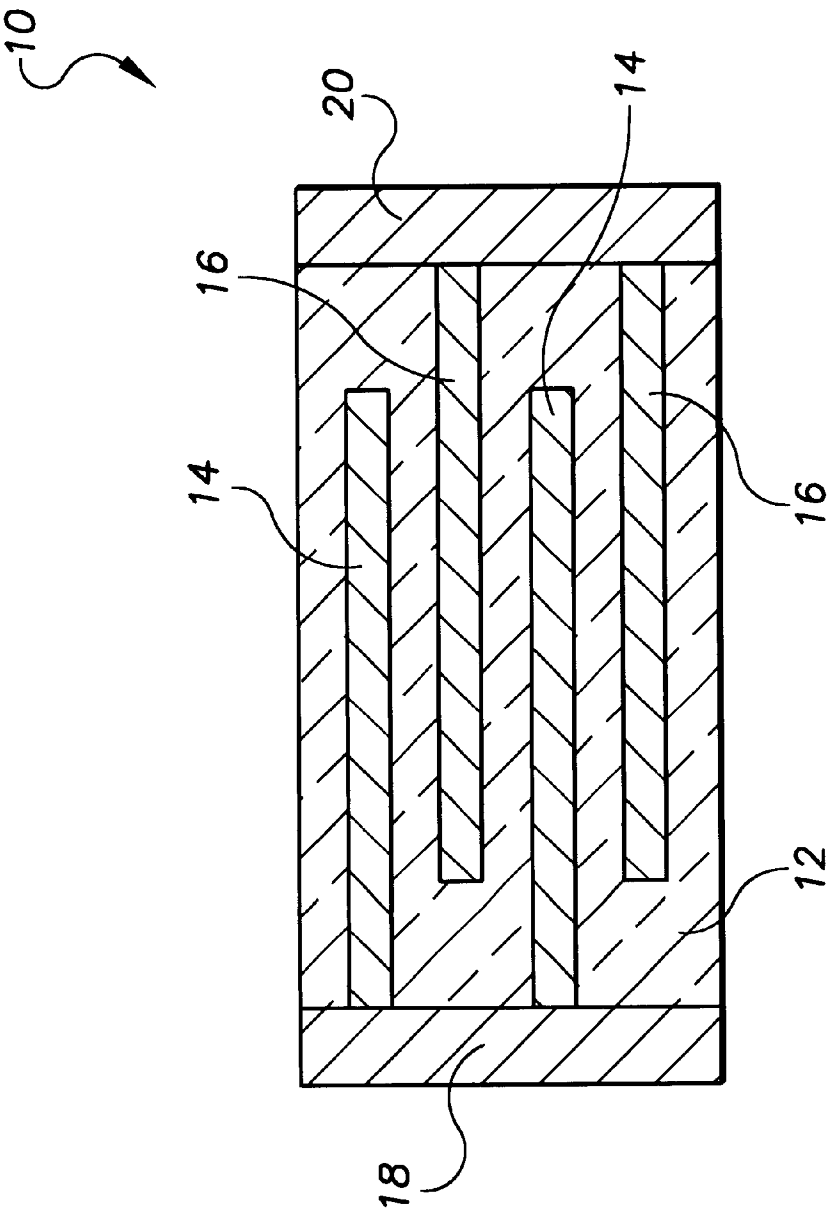
FIG. 1 is a cross-sectional view of a multilayer ceramic capacitor constructed in accordance with the present invention.

(FIGS. 3–12). Preferred ceramic powder formulations were then utilized in multilayer ceramic capacitor structures in examples 98–107, and performance data for those examples are shown in Tables 10–12 (FIGS. 13–16). A multilayer ceramic capacitor is shown in FIG. 1, and is generally designated by the reference numeral 10. The capacitor 10 includes a ceramic body 12, a first group or plurality of electrodes 14 buried within the body 12, a second group or plurality of electrodes 16 buried in the body 12 in capacitive relationship with the first plurality of electrodes 14, a first external terminal 18 connected to the first group of electrodes 14, and a second external electrode connected to the second group of electrodes 16.

The monolayer structure capacitor for examples 1–97 was made by preparing a 50 gram batch of a ceramic formulation described below and in the Tables 1–9 (FIGS. 3–12), using a 200 cc plastic jar and 500 grams of ytteria stabilized zirconia milling media. An organic binder/solvent dispersant solution of about 20 grams was added to the jar and then ball milled for about 12 hours. The slurry was then cast on a cardboard to dry the solvent. The dried cake was granulated and pressed into pellets at 15,000 PSI. The pellets were then sintered on a zirconia setter. The fired dimensions of the monolayer structures were about 1 cm in diameter, 0.1 cm in thickness. After measuring the fired density using Archimedes principle, the discs then had a silver ink applied to opposed surfaces to form electrodes in capacitive relationship. The structure was then fired at about 750° C. for 10 minutes. The electrical properties were then measured after 24 hours of aging at 1 KHz, 1 Vrms at 25°1 C.

The start powder mixture for all of the monolayer structure examples (examples 1–97) was at least ninety weight percent essentially pure barium titanate powder ($BaTiO_3$) having an average particle size of from 0.2 to 1.2 microns (most examples including $BaTiO_3$ between 0.7–0.9 microns), from 0.2 to 2.5 weight percent of barium lithium borosilicate, and from 0.1 to 0.3 weight percent of $MnCO_3$. The preferred composition of the barium lithium borosilicate ("BLBS") as described in a pending U.S. application of one of the inventors herein, is based on a unique composition of ($3BaO.1B_2O_3$)+($BaO.B_2O_3$) phases, which when combined in about 1:1 ratio, yield a eutectic melting temperature of about 972° C. (That pending U.S. patent application is application Ser. No. 09/652,562, filed on Aug. 31, 2000, which application is hereby incorporated herein by reference.) When this ratio is further combined with lithium silicate $Li_4SiO_4$, the melting temperature is further reduced to below 750° C. The preferred composition consists of (0.5 m of $BaO.B_2O_3$+0.5 m of $3BaO.B_2O_3$+1 m of $Li_4$, $SiO_4$) or in the form of the molar ratio of oxides; 2BaO, $1B_2O_3$, $2Li_2O$, $1SiO_2$.

Effect of BLBS Flux Additive

As shown in FIG. 3, Table 1 provides performance data for Examples 1 through 7. Table 1 describes monolayer devices with varying amount of BLBS flux sintering aid. As can be seen from this data, only 1% wt addition of the BLBS was required to reduce the sintering temperature of fine grain $BaTiO_3$ to 950° C., with a fired density in excess of 96% of theoretical value. This is very remarkable when such a composition without the additive will require in excess of 1250° C. to achieve similar density. Although the fired grain is relatively small (e.g., less than 1 micron), the temperature coefficient of capacitance ("TCC") does not meet the +/−15% X7R specification. The optimum BLBS level appeared to be around 2.0 wt %.

Effect of Rare Earth Oxides

In an attempt to smooth the TCC curve by forming a core-shell structure, various rare earth oxides additives were examined. The performance data of examples 8 thru 14 recorded in Table 2 (FIG. 4) show the effect of $Nd_2O_3$ addition at 2 wt % of the BLBS. The addition of $Nd_2O_3$ did increase the fired density to nearly theoretical value by forming a solid solution with $BaTiO_3$ and causing a shift downward in the curie temperature. Above 2.0%, the grain became fine, but the TCC is still outside the +/−15% limit. Also above 2.5%, the samples were porous with very little densification, as shown in examples 13, 14.

Effect of $Gd_2O_3$

Figure 2:
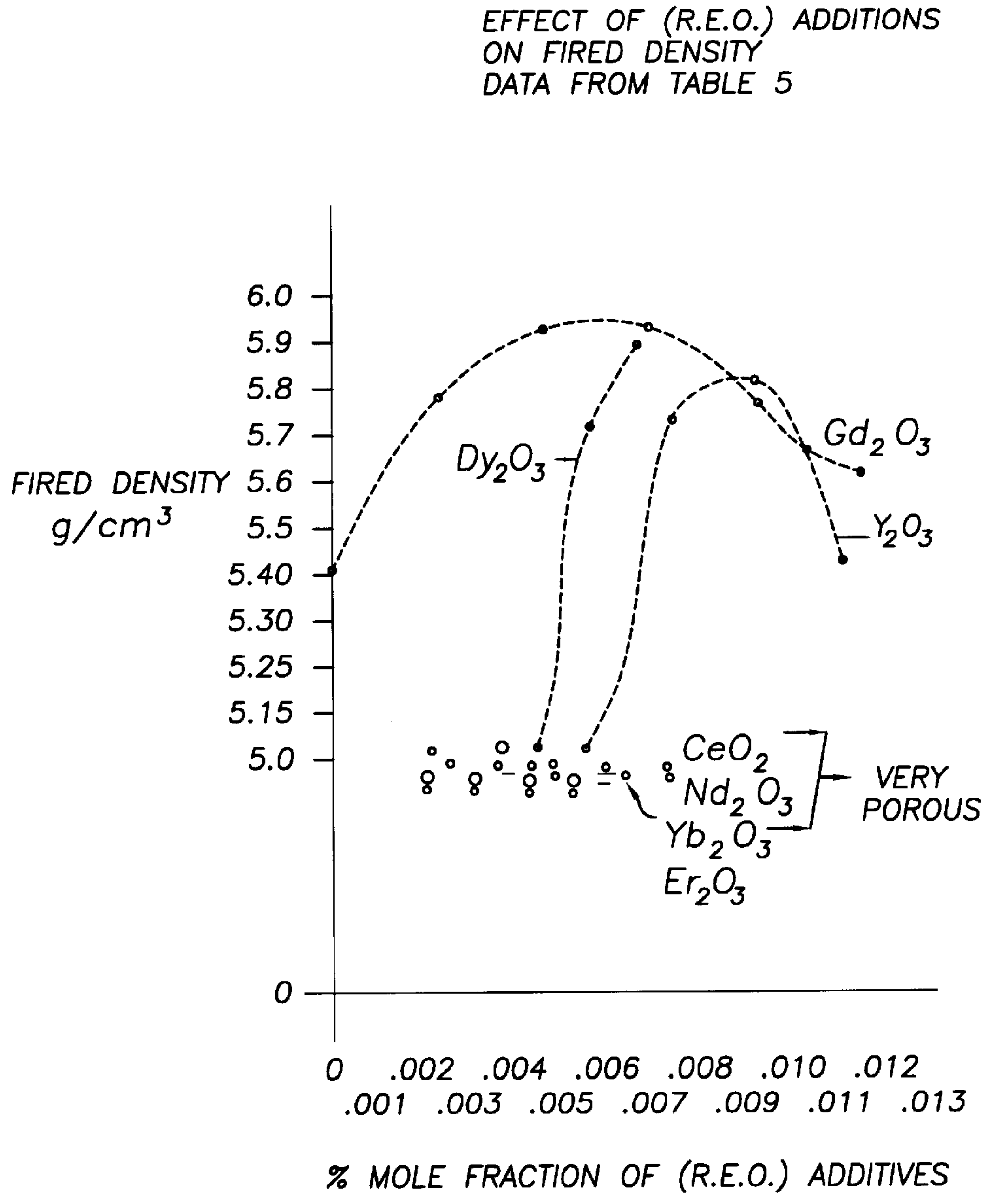
FIG. 2 is a graph showing effects of several rare earth oxides on a fired density of ceramic capacitors.

As shown in Table 3 (FIG. 5), unlike most other rare earth oxides, the gadolinium oxide ($Gd_2O_3$) additive was very unique in yielding fine grain structure over a wide range of additives. Examples 15 thru 19 show the effect of this additive. As shown in FIG. 2, other rare earth oxides with larger ionic radii, and with small ionic radii were not as effective as gadolinium oxide. About 0.8 wt % appeared to be near optimum, however, the TCC is still outside the X7R limit.

Effect of $Nb_2O_5$ Additive

In Table 4 (FIG. 6), the addition of $Nb_2O_5$ to $BaTiO_3$ is explored. Adding $Nb_2O_5$ to $BaTiO_3$ has been known to produce core-shell structure and yield a smooth temperature coefficient of capacitance. Examples (20–24) show the effect of $Nb_2O_5$ to a composition containing about 97 wt % $BaTiO_3$, 0.8 wt % $Gd_2O_3$, 2. wt % of BLBS flux and 0.1 $MnCO_3$. At a small amount (e.g., less than 0.6 wt % $Nb_2O_5$), the fired density was very low (e.g., less than 5.5 g/cm$^3$) with exaggerated grain growth in excess of 10 microns. At 0.8 wt %, the density increased to greater than 98% of theoretical value, however, there was some evidence of solid solution. At 1 wt % $Nb_2O_5$ (example 24) a high density and smooth TCC were achieved. Further tests established that up to 1.50 wt % $Nb_2O_5$ may be useful. Additional tests established that a niobate compound could be used as well, such as $BaNb_2O_6$, $CaNb_2O_6$, $MgNb_2O_6$, or $LiNbO_3$, in amounts that yield a weight percent ranging from 0.4 wt % to 1.50 wt % of $Nb_2O_5$, relative to a total weight of the ceramic powder mixture.

Additionally, to those skilled in the art, it is well understood that $Ta_2O_5$ (tantalum pentoxide) or a tantalum compound behaves similarly to $Nb_2O_5$, and gives similar results when utilized on the same molar basis as $Nb_2O_5$. The same molar proportion of $Ta_2O_5$ or a tantalum compound that is the molar equivalent of the aforesaid range of from 0.4 wt % to 1.50 wt % of $Nb_2O_5$, is a weight percent of $Ta_2O_5$ ranging from 0.66 wt % to 2.50 wt %. Therefore, for purposes herein, a preferred grain growth inhibitor will be referred to as a grain growth inhibitor selected from the group consisting of niobium compounds $Nb_2O_5$, $BaNb_2O_6$, $CaNb_2O_6$, $MgNb_2O_6$, $LiNbO_3$, or mixtures thereof such that a weight percent of $Nb_2O_5$ ranges from 0.4 wt % to 1.50 wt %, or tantalum compounds, or mixtures thereof such that a weight percent of $Ta_2O_5$ ranges from 0.66 wt % to 2.50 wt %, or a mixture of molar equivalents of the niobium and tantalum compounds. The "weight percent" of the grain growth inhibitor refers to the weight percent relative to the weight of the entire mixture to which the grain growth inhibitor is added.

Effect of various Rare Earth Oxides Additives with 2 wt % BLBS flux, 1% $Nb_2O_5$ 0.1 $MnCO_3$ and 0.2 wt % ($BaO.B_2O_3$) all sintered at 975° C.

In Table 5 (FIGS. 7, 8) a series of examples (25–62) clearly show the unexpected unique features of the $Gd_2O_3$ as compared to other rare earth oxides with smaller and larger ionic radii. Example 27 with composition 0.8 wt % $Gd_2O_3$ again showed the highest density, low dissipation factor ("D.F.") and TCC within +/−15%. FIG. 2 graphically describes the effect of these various additives on density after firing at 975° C. The additives are expressed in mole fraction relative to the total composition. It is clear from the FIG. 2 graph and the performance data in Table 5, that Gadolinium oxide provides substantially enhanced performance, unlike any of the other rare earth oxides, and hence produces unexpected and valuable results.

Effect of $WO_3$ and $MoO_3$ Additions

Table 6 (FIG. 9) shows that a small addition of $WO_3$ (e.g., less than 1. wt %) in examples 63–70 can also influence the solid solution and grain growth of the system. Examples 63–66 show the effect of this addition on the electrical properties. Relatively high density, fine grain and smooth TCC were achieved with addition ranging between 0.2 to 0.6 wt %, however, the dielectric constant ("K") decreased slightly. The addition of $MoO_3$ on equivalent molar fraction gave nearly similar results, as shown in examples 67–70.

Effect of $Mg_2TiO_4$ and $V_2O_5$ Additions

Table 7 (FIG. 10) shows that a small addition of $Mg_2TiO_4$ (e.g., less than 0.2 wt %) can also have a significant positive effect on fired density and electrical properties. Examples 71–74 show that above 0.1% the density and K decrease quite rapidly. Also the addition of a small amount of $V_2O_5$ (e.g., less than 0.2 wt %) shown in examples 75–77 gave a very smooth TCC, but the K was lower.

Effect of (BLBS) Addition on Firing Temperature and Electric Properties

In Table 8 (FIG. 11), using the optimum addition of 1.0 wt % $Nb_2O_5$, 0.8 wt % $Gd_2O_3$ and 0.1 $MnCO_3$, the effects of varying the BLBS content between 1.25 and 2.5 wt % were examined. Examples 78–91 show the properties as a function of firing temperature of 900° C., 950° C. and 975° C. It should be noted, however, that the results in this series were somewhat different than those shown earlier, specifically for the composition with 2 wt % flux (examples 81 and 87). The reason for this difference is attributed to the type of $BaTiO_3$. In this series, the particle size of $BaTiO_3$ was about 0.4 microns as compared to 0.7 to 0.9 microns for the $BaTiO_3$ used in the earlier examples.

Effect of Other Additives

Table 9 (FIG. 12) shows the effect of other additives that were examined for their effectiveness on core-shell structure, without the presence of $Nb_2O_5$ Examples 92–94 show the effect of $ZrO_2$, while examples 95–97 show the effect of $Sb_2O_3$. In both cases, grain growth and significant solid solutions were observed. Consequently, it may be concluded that $Nb_2O_5$ is an excellent grain growth inhibitor.

Examples of Multilayer Ceramic Capacitor ("MLCC")

The monolayer samples described above in examples 1–97 are sufficient to define a preferred compositional range of this invention. For example, it is considered that the ranges of components described in examples 24 (Table 4-FIG. 6), 27, 28, 29 (Table 5-FIG. 7), and 64, 65, 66, 67, 68, 69 (Table 6-FIG. 9) show a dielectric constant greater than 2500 in very low fired or sintered ceramic powders with exceptional X7R performance characteristics. The identified preferred compositional range of the aforesaid dielectric ceramic powders were then utilized in making multilayer ceramic capacitor examples to show the physical and electrical properties of the dielectric powders in a MLCC type structure with a high silver content Silver—Palladium ("Ag/Pd") electrode system. In most cases, the MLCC consisted of 10 to 20 layers of alternating dielectric films and an Ag/Pd electrode. Composition of the Ag/Pd can range from 0% palladium up to 20% palladium with the balance being silver. The fired layer thickness of the dielectric within the capacitive electrodes ranged between 15 and 30 microns. The capacitance and dissipation factor (DF) are measured at 1 KHz, 1 Vrms and after 24 hours of aging at 25° C. Other electrical properties such as TCC, dielectric breakdown voltage, insulation resistance at 125° C., and life test at accelerated temperature and voltage are also described in Tables 10–13 (FIGS. 13–16).

Example 98 in Table 10 provides data for a multilayer ceramic capacitor structure (3.0×2.5 mm) with 3 active layers of 25 microns and internal electrode consisting of 85 wt % Ag/15 wt % Pd system. When these MLCC's were fired at 975° C., good K, D.F. and TCC were achieved. However, the insulation resistance ("I.R.") at 125° C. and 300V showed some degradation. This result is undesirable for long term performance of the capacitor. Ideally, there should be little or no change in I.R. with time.

Example 99 was essentially the same as 98, but increase in $MnCO_3$ content to 0.2 wt %. This increase in the manganese oxide gave very stable I.R. over a long period. However, it seemed also to have affected the sintering condition and some solid solution was observed.

Examples 100 and 101 shown in Table 11 (FIG. 14) show similar MLCC structures but 10 active layers at 25 microns fired layer thickness. In these examples, the effects of $ZrO_2$ and $TiO_2$ were examined. These examples show a slight modification of the stoichiometry relative to the barium titanate ($BaO/TiO_2$), and they demonstrate acceptable performance characteristics.

In Table 12 (FIG. 15), Example 102 shows the properties of optimum composition with 0.25 wt % $MnCO_3$. This increase gave good properties when fired at 950° C. but shows slight solid solution when fired at 975° C. Examples 103, 104 and 105 were essentially the same composition, but with small addition of 0.2 wt % $BaO.B_2O_3$+0.2 $ZrO_3$ (103), 0.15 wt % $V_2O_5$ (104), and 0.6 wt % $Mg_2TiO_4$ (105).

Examples 106 and 107 in Table 13 (FIG. 16) show the effect of $WO_3$ addition. At 0.4 wt % (106), good electrical properties were observed. However, at 0.6 wt % (107) a slight degradation in I.R. was observed.

Although research of the inventors herein was primarily directed to ceramic powders and multilayer capacitors made from the ceramic powders that satisfy X7R performance characteristics, during the course of the research, the inventors also discovered that certain compositions may be useful for Y5V performance characteristics with respect to the TCC (temperature coefficient of capacitance). The Y5V TCC requirement is that a change in dielectric constant ("K") should be within −80% and +22% between a temperature range of −30° C. and +85° C. (relative to the K value at 25° C). In compositions that satisfy Y5V characteristics, solid solution between the barium titanate or barium titanate zirconate and the additives is desirable to attain necessary high dielectric constant values.

Examples 108–111 (FIGS. 17 & 18) describe some of the compositions and corresponding electrical properties that satisfy Y5V performance characteristics. Examples 108, 109 and 110 as shown in Table 14 represent monolayer samples, consisting of barium titanate zirconate ($BaTi_{.8}Zr_{.2})O_3$ ("BTZ")+$Nd_2O_3$+BLBS flux and $MnCO_3$. It can be seen from Table 14 that example 108 gave a high K (dielectric constant) greater than 8,000 with a TCC satisfying the Y5V characteristic. Example 111 (FIG. 18, Table 15), shows properties of a composition with 1.5% BLBS flux in a multilayer ceramic capacitor ("MLC"). This example 111 also showed good electrical properties, including high and stable insulation resistance at 150V and 125° C. Further research on such ceramic powders is ongoing by the inventors.

It is clear from the exhaustive research of the inventors and the data reported herein that a remarkable advance has been achieved through the optimal composition of a start powder for making a high dielectric constant, very low temperature fired X7R ceramic capacitor, wherein the start powder includes: at least ninety weight percent essentially pure barium titanate powder having an average particle size of from 0.2 to 1.2 microns; from 0.2 to 2.5 weight percent of barium lithium borosilicate; from 0.1 to 0.3 weight percent of $MnCO_3$; an optimal grain growth inhibitor of 0.4 to 1.50 weight percent $Nb_2O_5$ or an equivalent amount of $Nb_2O_5$ introduced in the form of niobate, such as $BaNb_2O_6$, $CaNb_2O_6$, $MgNb_2O_6$, $LiNbO_3$; and, 0.4 to 1.2 weight percent of $Gd_2O_3$. Ceramic powder of this formulation and multilayer capacitors made from this formulation include no toxic heavy metal oxides, and provide for usage of a silver-palladium alloy having a silver content ranging from 85% to 100%.

As described above, it has been found that the use of $Gd_2O_3$ in combination with other rare earth oxides in the range of 0.6 to 1.5 wt % and the grain growth inhibitor $Nb_2O_5$ in the range of 0.4 to 1.50 wt % are very essential in obtaining the desired electrical properties. These properties include, a dielectric constant or K greater than 2500, a dissipation factor (DF) less than 2.5%, and a TCC within +/−15% between −55° C. and 125° C. Also, it was discovered that a higher amount of manganese oxide in the form of $MnCO_3$ additive up to 0.3 wt % provides high insulation resistance and long term stability on life tests at elevated temperature and voltage.

The present invention therefore includes a dielectric ceramic start powder mixture comprising at least ninety weight percent essentially pure barium titanate powder having an average particle size of from 0.2 to 1.2 microns; from 0.2 to 2.5 weight percent of barium lithium borosilicate; from 0.1 to 0.3 weight percent of $MnCO_3$; a grain growth inhibitor selected from the group consisting of niobium compounds $Nb_2O_5$, $BaNb_2O_6$, $CaNb_2O_6$, $MgNb_2O_6$, $LiNbO_3$, or mixtures thereof such that a weight percent of $Nb_2O_5$ ranges from 0.4 wt % to 1.50 wt %, or tantalum compounds, or mixtures thereof, such that a weight percent of $Ta_2O_5$ ranges from 0.66 wt % to 2.50 wt %; and, 0.4 to 1.2 weight percent of $Gd_2O_3$, or a mixture of molar equivalents of the niobium and tantalum compounds.

An additional aspect of the invention includes a method of making a preferred dielectric ceramic powder, which includes the steps of mixing the above described start powder mixture; mildly calcining the start powder mixture at about 450° C. to about 550° C. to obtain a powder comprised of agglomerates of the mixture of start powders wherein each of the agglomerates has essentially the same compositional ratios as the start powder of the barium titanate, barium lithium borosilicate, grain growth inhibitor, $MnCO_3$, and gadolinium oxide ($Gd_2O_3$); in order to provide a powdered mixture capable of being sintered in an open zirconia setter at from 950° C. to 1,025° C. to produce a dielectric ceramic body yielding a fired density greater than 5.75 g/cm$^3$, a dielectric constant ("K") greater than 2,500, and a smooth TCC wherein the K will be within +/−15% relative to 25° C. temperature values within a temperature range of between −55° C. to 125° C.

A further aspect of this invention includes a method for making a multilayer ceramic capacitor body that satisfies X7R performance characteristics. The method includes the steps of forming a slurry of the above described calcined start powder mixture; preparing layers of the slurry; drying the layers; forming a stack of a plurality of the layers and interleaving patterned films of silver-palladium electrode ink between successive adjacent pairs of layers, wherein the silver-palladium electrode ink includes 85% wt or more of silver; and then heating to mature the stack of layers by sintering in open air at a temperature of between 950° C. to 1,025° C. for between 3 to 5 hours to produce a dense ceramic capacitor body with buried electrodes. The invention also includes the multilayer ceramic capacitor made thereby.

While the present invention has been described and illustrated with respect to specified examples and embodiments, it should be understood that the invention is not limited to those described examples. For example, while preferred examples (e.g., Example 27, 63–69) describe a preferred weight percent of gadolinium oxide ($Gd_2O_3$) as "0.8", it is to be understood that the phrase "about 0.8 weight percent" is to mean 0.8 weight percent plus or minus 20%, in an endeavor to describe an optimal proportion or embodiment. The same meaning of the phrase "about_weight percent" will also apply herein to other compounds referred to in such a phrase. Additionally, the invention includes making a capacitor from the preferred embodiments of the described dielectric ceramic powder by "forming a slurry" of the powder "by a dispersion of the mixture in a binder-solvent-dispersion system". It is to be understood, however, that "forming a slurry" of the powder may be accomplished by any means known in the art. Accordingly, reference should be made primarily to the attached claims rather than to the foregoing description and examples to determine the scope of the invention.

What is claimed is:

1. A dielectric ceramic start powder comprising:

a. at least ninety weight percent essentially pure barium titanate having an average particle size of from 0.2 to 1.2 microns;

b. from 0.2 to 2.5 weight percent barium lithium borosilicate;

c. from 0.1 to 0.3 weight percent $MnCO_3$;

d. a grain growth inhibitor selected from the group consisting of niobium compounds $Nb_2O_5$, $BaNb_2O_6$, $CaNb_2O_6$, $MgNb_2O_6$, $LiNbO_3$, or mixtures thereof such that a weight percent of $Nb_2O_5$ ranges from 0.4 wt % to 1.50 wt %, or tantalum compounds, or mixtures thereof, such that a weight percent of $Ta_2O_5$ ranges from 0.66 wt % to 2.50 wt %, or a mixture of molar equivalents of the niobium and tantalum compounds; and, e. from 0.4 to 1.2 weight percent gadolinium oxide.

2. The dielectric ceramic start powder of claim 1, wherein the weight percent of the gadolinium oxide is about 0.8 percent.

3. The dielectric ceramic start powder of claim 1, wherein the weight percent of the grain growth inhibitor is about 1.0 percent $Nb_2O_5$.

4. The dielectric ceramic start powder of claim 1, further comprising from 0.2 to 0.6 weight percent of $WO_3$.

5. The dielectric ceramic start powder of claim 1, further comprising from 0.07 to 0.2 weight percent of $MoO_3$.

6. A method for making a dielectric ceramic powder comprising the steps of:

a. preparing a mixture of a dielectric ceramic start powder including at least ninety weight percent essentially pure barium titanate having an average particle size of from 0.2 to 1.2 microns, from 0.2 to 2.5 weight percent barium lithium borosilicate, from 0.1 to 0.3 weight percent $MnCO_3$, a grain growth inhibitor selected from the group consisting of niobium compounds $Nb_2O_5$, $BaNb_2O_6$, $CaNb_2O_6$, $MgNb_2O_6$, $LiNbO_3$, or mixtures thereof such that a weight percent of $Nb_2O_5$ ranges from 0.4 wt % to 1.50 wt %, or tantalum compounds, or mixtures thereof, such that a weight percent of $Ta_2O_5$ ranges from 0.66 wt % to 2.50 wt %, or a mixture of molar equivalents of the niobium and tantalum compounds; and, from 0.4 to 1.2 weight percent gadolinium oxide;

b. mildly calcining the dielectric ceramic start powder at about 450° C. to about 550° C. to obtain a dielectric ceramic powder comprised of agglomerates of the mixture of start powder wherein each of the agglomerates has essentially the same compositional ratios as the start powder of the barium titanate, barium lithium borosilicate, $Nb_2O_5$, $MnCO_3$, and gadolinium oxide;

to provide a dielectric ceramic powder capable of being sintered in open air at from 950° C. to 1,025° C. to produce a dielectric ceramic body that satisfies X7R capacitor performance characteristics.

7. The method for making the dielectric ceramic powder of claim 6, wherein the weight percent of the gadolinium oxide is about 0.8 percent.

8. The method for making the dielectric ceramic powder of claim 6, wherein the weight percent of the grain growth inhibitor is about 1.0 percent $Nb_2O_5$.

9. The method for making the dielectric ceramic powder of claim 6, wherein the preparing a mixture step further comprises mixing from 0.2 to 0.6 weight percent of $WO_3$ in the mixture and mixing from 0.07 to 0.2 weight percent of $MoO_3$ in the mixture.

10. A method for making a multilayer ceramic capacitor that satisfies X7R capacitor performance characteristics, comprising the steps of:

a. preparing a mixture of a dielectric ceramic start powder including at least ninety weight percent essentially pure barium titanate having an average particle size of from 0.2 to 1.2 microns, from 0.2 to 2.5 weight percent barium lithium borosilicate, from 0.1 to 0.3 weight percent $MnCO_3$; a grain growth inhibitor selected from the group consisting of niobium compounds $Nb_2O_5$, $BaNb_2O_6$, $CaNb_2O_6$, $MgNb_2O_6$, $LiNbO_3$, or mixtures thereof such that a weight percent of $Nb_2O_5$ ranges from 0.4 wt % to 1.50 wt %, or tantalum compounds, or mixtures thereof, such that a weight percent of $Ta_2O_5$ ranges from 0.66 wt % to 2.50 wt %, or a mixture of molar equivalents of the niobium and tantalum compounds; and, from 0.4 to 1.2 weight percent gadolinium oxide;

b. mildly calcining the dielectric ceramic start powder at about 450° C. to about 550° C. to obtain a dielectric ceramic powder comprised of agglomerates of the mixture of start powder wherein each of the agglomerates has essentially the same compositional ratios as the start powder of the barium titanate, barium lithium borosilicate, $Nb_2O_5$, $MnCO_3$, and gadolinium oxide;

c. forming a slurry of the calcined ceramic powder;

d. preparing layers of the slurry;

e. forming a stack of a plurality of the layers and interleaving at least one silver-palladium electrode between adjacent layers;

f. heating to mature the stack of layers by sintering in open air at a temperature of between 950° C. to 1,025° C. to produce a multilayer ceramic capacitor body with at least one buried electrode.

11. The method for making a multilayer ceramic capacitor of claim 10, wherein the silver-palladium electrode comprises 85 weight percent or more of silver.

12. The method for making a multilayer ceramic capacitor of claim 11, wherein the weight percent of the gadolinium oxide is about 0.8 percent.

13. The method for making the multilayer ceramic capacitor of claim 12 wherein the weight percent of the grain growth inhibitor $Nb_2O_5$ is about 1.0 percent $Nb_2O_5$.

14. The method for making the multilayer ceramic capacitor of claim 13, wherein the preparing a mixture step further comprises mixing from 0.2 to 0.6 weight percent of $WO_3$ in the mixture, and mixing from 0.07 to 0.2 weight percent of $MoO_3$ in the mixture.

15. A multilayer ceramic capacitor that satisfies X7R capacitor performance characteristics having a least one electrode buried within a body of the capacitor, and an external terminal connected to the at least one electrode, the body comprising:

a. at least ninety weight percent essentially pure barium titanate;

b. from 0.2 to 2.5 weight percent barium lithium borosilicate;

c. from 0.1 to 0.3 weight percent $MnCO_3$;

d. a grain growth inhibitor selected from the group consisting of niobium compounds $Nb_2O_5$, $BaNb_2O_6$, $CaNb_2O_6$, $MgNb_2O_6$, $LiNbO_3$, or mixtures thereof such that a weight percent of $Nb_2O_5$ ranges from 0.4 wt % to 1.50 wt %, or tantalum compounds, or mixtures thereof, such that a weight percent of $Ta_2O_5$ ranges from 0.66 wt % to 2.50 wt %, or a mixture of molar equivalents of the niobium and tantalum compounds; and, e. from 0.4 to 1.2 weight percent gadolinium oxide.

16. The multilayer ceramic capacitor of claim 15, wherein the electrode comprises a silver-palladium electrode having 85 weight percent or more of silver.

17. The multilayer ceramic capacitor of claim 15, wherein wherein the weight percent of the gadolinium oxide is about 0.8 percent.

18. The multilayer ceramic capacitor of claim 15, wherein the weight percent of the grain growth inhibitor is about 1.0 percent $Nb_2O_5$.

19. The multilayer ceramic capacitor of claim 15, further comprising from 0.2 to 0.6 weight percent of $WO_3$ and from 0.07 to 0.2 weight percent of $MoO_3$.

* * * * *